(12) United States Patent
Azuma et al.

(10) Patent No.: US 6,441,888 B1
(45) Date of Patent: Aug. 27, 2002

(54) RANGEFINDER

(75) Inventors: Takeo Azuma, Nara; Kenya Uomori, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/527,476

(22) Filed: Mar. 17, 2000

(30) Foreign Application Priority Data

Mar. 17, 1999 (JP) .......................................... 11-072592

(51) Int. Cl.[7] .............................. G01C 3/08; G03H 1/22; H04N 7/18; H04N 9/47
(52) U.S. Cl. .................... 356/4.01; 356/5.04; 356/4.06; 359/32; 348/131; 348/132
(58) Field of Search ............................. 356/5.04, 4.01, 356/3.11, 4.06, 4.03, 3.02; 348/131, 132, 139, 455, 68; 354/419; 359/27, 32

(56) References Cited

U.S. PATENT DOCUMENTS

| | | | | |
|---|---|---|---|---|
| 4,594,001 A | * | 6/1986 | DiMatteo et al. ............ | 356/376 |
| 5,051,906 A | * | 9/1991 | Evans, Jr. et al. .......... | 364/424 |
| 5,064,291 A | * | 11/1991 | Reiser ........................ | 356/372 |
| 5,387,930 A | * | 2/1995 | Toh ............................. | 348/207 |
| 5,608,455 A | * | 3/1997 | Oda ............................ | 348/245 |
| 5,682,229 A | * | 10/1997 | Wangler ..................... | 356/4.01 |
| 5,930,383 A | * | 7/1999 | Netzer ........................ | 382/154 |
| 5,995,650 A | * | 11/1999 | Migdal et al. ............... | 382/154 |
| 6,040,910 A | * | 3/2000 | Wu et al. .................... | 356/376 |
| 6,100,517 A | * | 8/2000 | Yahav et al. ................ | 250/208 |
| 6,137,566 A | * | 10/2000 | Leonard et al. ........... | 356/141.1 |
| 6,268,918 B1 | * | 7/2001 | Tanabe et al. .............. | 356/376 |
| 6,313,902 B1 | * | 11/2001 | Enomoto ..................... | 355/18 |

OTHER PUBLICATIONS

Brian Carrihill et al., "Experiments with the Intensity Radio Depth Sensor", Computer Vision, Graphics, and Image Processing 32, pp. 337–358, Academic Press, Inc., 1985.

* cited by examiner

Primary Examiner—Thomas H. Tarcza
Assistant Examiner—Brian Andrea
(74) Attorney, Agent, or Firm—Nixon Peabody LLP; Donald R. Studebaker

(57) ABSTRACT

A rangefinder performs highly accurate 3D measurement without being affected by any variation in intensity of projected light. A light source for projecting light onto an object is provided with a light receiver for detecting the intensity of the projected light. The intensity of a reflected part of the projected light, which has been captured by a camera as an image, is corrected using the light intensity, which has been detected by the light receiver, as correction information. And based on this corrected image, a distance calculator produces a range image. Thus, even if the intensity of the projected light has changed, a corresponding variation in intensity of the reflected light image can be compensated for.

9 Claims, 27 Drawing Sheets

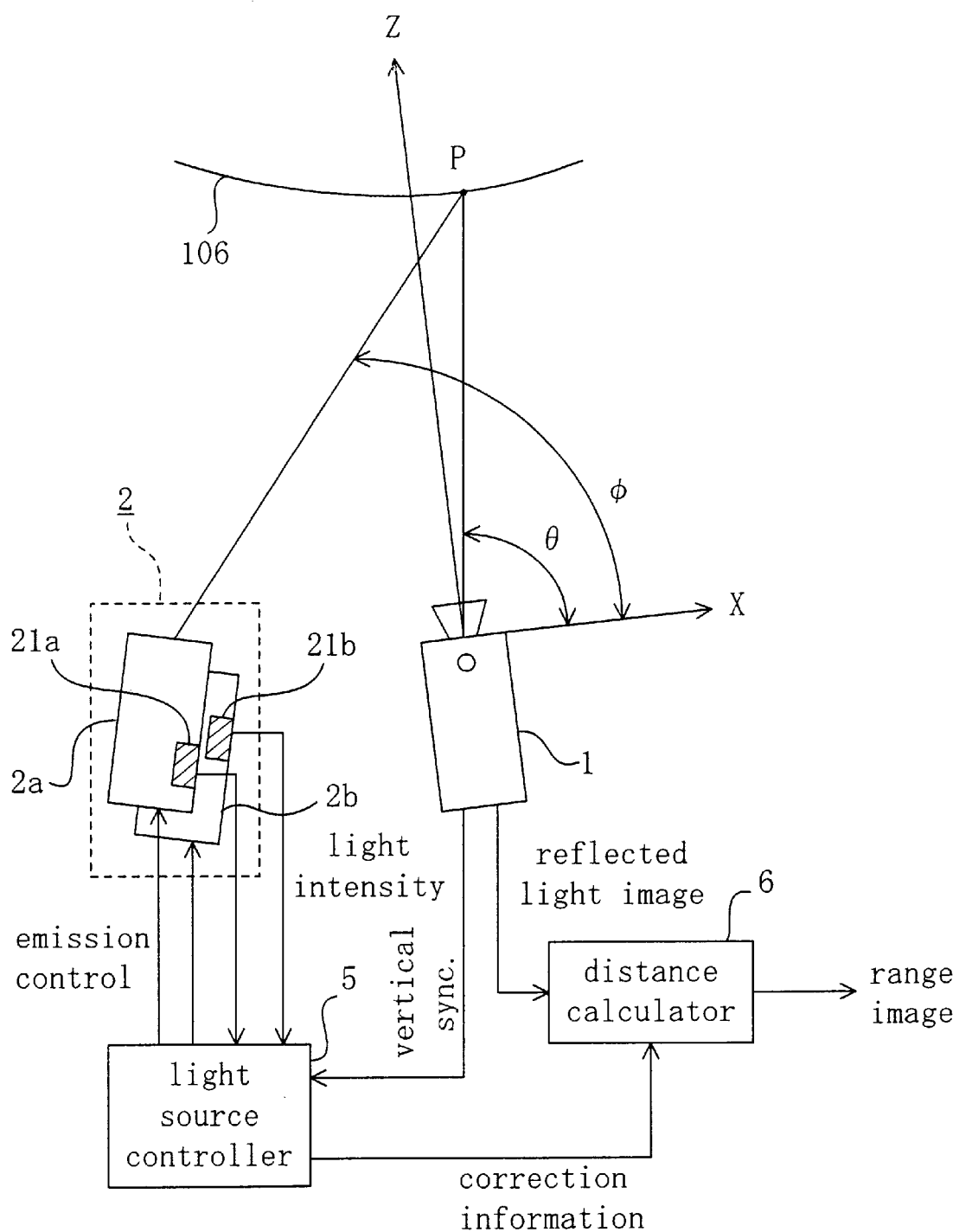

Fig. 7a vertical sync.

Fig. 7b emission control a

Fig. 7c emission control b

Fig. 7d read intensity of light source 2a

Fig. 7e read intensity of light source 2b

Fig. 7f operation intervals

RANGEFINDER

BACKGROUND OF THE INVENTION

The present invention relates to a rangefinder for measuring the three-dimensional (3D) shape or obtaining range information of an object.

FIG. 24 illustrates an exemplary configuration for a prior art rangefinder. The rangefinder shown in FIG. 24 captures a set of images of an object by projecting light onto the object, thereby measuring the 3D shape of the object based on the principle of triangulation. The rangefinder shown in FIG. 24 was designed to operate in real time.

As shown in FIG. 24, the rangefinder includes laser light sources 101A and 101B, half mirror 102, light source controller 103, rotating mirror 104, rotation controller 105, lens 107, wavelength separating filters 108A and 108B, CCD's 109A, 109B, 109C, signal processors 110A, 110B, 111, distance calculator 112 and controller 113. The wavelengths of laser beams emitted from the light sources 101A and 101B are slightly different from each other. The laser beams outgoing from the light sources 100A and 101B are combined with each other at the half mirror 102. The intensities of the beams emitted from the light sources 101A and 101B are controlled by the light source controller 103. The rotating mirror 104 is provided to scan the combined laser radiation and the rotation thereof is controlled by the rotation controller 105. The laser radiation, which has been projected onto an object 106 and reflected therefrom, is condensed by the lens 107, selectively passed through the wavelength separating filters 108A and 108B and then incident on the CCD's 109A, 109B and 109C. The filters 108A and 108B separate parts of the reflected radiation with the same wavelengths as those of the light sources 101A and 101B, respectively. The CCD's 109A and 109B capture monochromatic images of the object 106, while the other CCD 109C captures a color image of the object 106. The signal processors 110A, 110B and 111 are provided for these CCD's 109A, 109B and 109C, respectively. The distance calculator 112 obtains, by computation, information about the distance or shape of the object 106 based on the intensities of the beams incident on the CCD's 109A and 109B. And the controller 113 synchronizes or controls the overall operating timing of this rangefinder.

Hereinafter, it will be described how the rangefinder shown in FIG. 24 operates.

The laser light sources 101A and 101B emit laser beams with slightly different wavelengths. These laser beams are in the shape of a slit with an optical cross section crossing the scanning direction of the rotating mirror 104 at right angles. That is to say, if the rotating mirror 104 scans the laser beams horizontally, then the slitlike beams extend vertically.

FIG. 25 illustrates how the intensities of the laser beams projected from these two light sources 101A and 101B change with wavelength. As can be seen from FIG. 25, the beams emitted from these light sources 101A and 101B have close wavelengths. This is because the reflectance of the object 106 is less dependent on the wavelength in such a case. As described above, the laser beams emitted from the laser light sources 101A and 101B are combined into a single beam at the half mirror 102. Then, the combined beam is scanned at the rotating mirror 104 toward the object 106.

The rotation controller 105 drives the rotating mirror 104 on a field-by-field basis, thereby scanning the laser beams that have been projected from the light sources 101A and 101B. In this case, the light source controller 103 changes the intensities of the beams emitted from these light sources 101A and 101B as shown in FIG. 26($a$) within the cycle time of one field. That is to say, the intensities of the laser beams are changed while the rotating mirror is driven.

The laser radiation that has been reflected from the object 106 is condensed by the lens 107 toward the CCD's 109A, 109B and 109C. The wavelength separating filter 108A selectively transmits only a part of the laser radiation with the same wavelength as that of the beam emitted from the light source 101A but reflects the remaining parts of the radiation with other wavelengths. On the other hand, the wavelength separating filter 108B selectively transmits only a part of the laser radiation with the same wavelength as that of the beam emitted from the light source 101B but reflects the remaining parts of the radiation with other wavelengths. As a result, respective parts of the laser beams that have been projected from the light sources 101A and 101B onto the object 106 and then reflected therefrom are incident on the CCD's 109A and 109B, respectively. And the rest of the laser radiation with other wavelengths is incident onto, and captured as a color image by, the CCD 109C.

The signal processors 110A and 1108 perform signal processing on the outputs of the CCD's 109A and 109B as is done for an ordinary monochromatic camera. On the other hand, the signal processor 111 performs signal processing on the output of the CCD 109C as is done for an ordinary color camera.

The distance calculator 112 obtains distances for respective pixels based on the outputs of the CCD's 109A and 109B, the baseline length and the coordinates of the pixels.

Specifically, based on the outputs of the CCD's 109A and 20 109B, the distance calculator 112 calculates an intensity ratio of the reflected parts of the laser radiation. The relationship between the intensity ratio and the scanning time is known. Accordingly, if an intensity ratio is given, then a specific point in time during one scan period can be estimated automatically. And the angel $\phi$ of rotation of the rotating mirror 104 can be derived from the specific point in time. For example, as shown in FIG. 26($b$), supposing the intensity ratio is Iao/Ibo, then the scanning time is estimated to be t0, from which the angle $\phi$ of rotation of the rotating mirror 104 is known. This angle $\phi$ corresponds to the angle formed by a visual axis, which extends from the light source to the object, with the X-axis.

The relationship between the scanning time t and the angle $\phi$ of rotation of the rotating mirror 104 is already known, too. Thus, a characteristic table representing the relationship between the intensity ratio Ia/Ib and the angle $\phi$ of rotation may be prepared by substituting the angle $\phi$ of rotation for the axis of abscissas of the graph shown in FIG. 26($b$). In such a case, the angle $\phi$ of rotation can be derived directly from the given intensity ratio without using the scanning time t.

FIG. 27 diagrammatically illustrates how the distance calculator 112 derives the distance. In FIG. 27, O is the center of the lens 107, P is a point of incidence on the object 106 and Q is a point at which the axis of rotation of the rotating mirror 104 is located. For the illustrative purposes, the CCD 109 is illustrated as being located closer to the object 106. The distance between the CCD 109 and the center O of the lens 107 is identified by f. Supposing the baseline length between the points O and Q is L, the angle formed by a visual axis QP with the X-axis within the XZ plane is $\phi$, the angle formed by another visual axis OP with the X-axis within the XZ plane is $\theta$ and the angle formed by still another visual axis OP with the Z-axis within the YZ plane is $\omega$, the three-dimensional coordinates (X, Y, Z) of the point P are given by the following equations:

$$X = L \cdot \tan\phi / (\tan\theta + \tan\phi)$$

$$Y = L \cdot \tan\theta \cdot \tan\phi \cdot \tan\omega / (\tan\theta + \tan\phi)$$

$$Z = L \cdot \tan\theta \cdot \tan\phi / (\tan\theta + \tan\phi)$$

In these equations, the angle φ can be derived from the intensity ratio of the reflected beams that are being monitored by the CCD's 109A and 109B as described above. On the other hand, the angles θ and ω can be derived from the coordinates of pixels on the CCD's 109A and 109B.

By calculating the three-dimensional coordinates (X, Y, Z) in accordance with these equations for all the pixels in each of the images captured by the cameras, 3D information about the object can be obtained. Also, if only the Z coordinates are derived for each image, then a range image can be obtained.

A cost-reduced rangefinder, whose light source section does not perform any mechanical operation, was also proposed. The rangefinder of this type includes no sweep means such as laser light sources or rotating mirrors. Instead, the rangefinder includes a light source section that can project multiple beams with mutually different two-dimensional (2D) radiation patterns.

Specifically, this alternative rangefinder projects multiple beams with different 2D radiation patterns onto an object on a timing-sharing basis, makes cameras capture the images of the object as represented by the reflected beams thereof and estimates the distance of the object based on the intensities of the reflected beams. The rangefinder estimates the distance by deriving three-dimensional information about the object based on the coordinates of the images and in accordance with the relationship between the intensity ratio or the intensities of the reflected beams and the angles of projection of beams irradiated.

The rangefinder of this type can perform three-dimensional measurement much more stably and reliably, because the entire measurement process is implemented by electronic operations. In addition, since this rangefinder needs no mechanical operations, the cost thereof is relatively low.

The prior art rangefinder, however, has the following drawbacks.

The rangefinder including the light source section for projecting multiple beams with mutually different 2D radiation patterns ordinarily uses xenon flash lamps as its light sources. However, the intensity of a beam emitted from such a flash lamp is variable by about ±5% or less every time the beam is emitted. Accordingly, even when the same object is imaged, the intensity of a beam reflected therefrom or the intensity ratio is changeable. In addition, variation is also found among individual flash lamps. Thus, the distance of the object cannot be estimated accurately without taking those variations into account.

In the rangefinder with the laser light sources on the other hand, each of the beams emitted from the light sources is vertically magnified by a lens system, transformed into a slitlike beam and then made to sweep the object using a rotating mirror. Such a rangefinder estimates the distance of the object while assuming the intensity of the projected beam is variable only horizontally but is constant vertically. Actually, though, the intensity of the slitlike beam is non-uniform due to the effects of lens shading. Specifically, since the intensity of the beam locally attenuates when passing through the lens system, the intensity at the edges of the slit is weaker than the intensity at the center of the slit. That is to say, since the intensity is also variable vertically, there is no longer one-to-one correspondence between the intensity ratio of the reflected beams monitored and the directions in which the beams were projected, thus making it difficult to estimate the distance accurately. A similar problem might be caused even when multiple beams with different 2D radiation patterns are projected.

SUMMARY OF THE INVENTION

It is therefore an object of the present invention to provide a rangefinder that can perform highly accurate 3D measurement of an object without being affected by any possible variation in intensity of projected light.

It is also an object of the invention to provide a rangefinder that can measure the 3D shape of an object very accurately even if there is no one-to-one correspondence between the optical characteristic of reflected light and the direction in which light was projected in an image captured by a camera.

Specifically, an inventive rangefinder includes: a light source for projecting light onto an object such that an intensity of the projected light varies on the object at least from place to place; a camera for capturing an image of the object by using part of the projected light, which part has been reflected from the object; and a 3D information generator for generating 3D information of the object from the reflected light image captured by the camera. The 3D information generator includes a light intensity corrector. The corrector corrects an intensity of the reflected light image according to correction information representing an intensity of the projected light, and generates the 3D information using an image that has been corrected by the light intensity corrector.

In the rangefinder of the present invention, the intensity of the reflected light image captured by the camera is corrected by the light intensity corrector according to the correction information representing the intensity of the projected light. And the 3D information generator generates the 3D information using an image that has been corrected by the light intensity corrector. Thus, even if the intensity of the projected light has changed, a corresponding variation in intensity of the reflected light image is compensated for by the light intensity corrector. As a result, the rangefinder can obtain highly accurate 3D information without being affected by any variation in intensity of the projected light.

In one embodiment of the present invention, the light source may project multiple light beams with mutually different projection patterns. The light intensity corrector may correct respective intensities of reflected light images corresponding to the projected beams. And the 3D information generator may generate the 3D information based on a ratio of intensities of the reflected light images that have been corrected by the light intensity corrector.

In another embodiment of the present invention, the rangefinder may further include a light receiver for detecting an intensity of the light that has been projected from the light source and outputting the intensity as the correction information.

In still another embodiment, the light intensity corrector may use, as the correction information, brightness in a predetermined part of the image captured by the camera.

In yet another embodiment, the light intensity corrector may perform offset processing on the reflected light image by subtracting black level components from image data and then make the correction.

Another inventive rangefinder includes: a light source for projecting light onto an object such that a characteristic of the projected light varies depending on a direction in which the light has been projected; a camera for capturing an image of the object by using part of the projected light, which part has been reflected from the object; and a 3D information generator for generating 3D information of the object from the reflected light image captured by the camera. The 3D information generator includes multiple lookup tables, each describing a correspondence between the characteristic of the reflected light and the direction in which the light has been projected, selects at least one of the lookup tables for each pixel location in the image captured by the camera and generates the 3D information by reference to the lookup table(s) selected.

According to the present invention, the 3D information generator includes multiple lookup tables, each describing a correspondence between the characteristic of the reflected light and the direction in which the light has been projected, and selects one of the tables for each pixel location in the image captured by the camera. Thus, even when one-to-one relationship between the optical characteristic of the reflected light and the direction in which the light has been projected is not met in the image captured by the camera, highly accurate 3D information can still be obtained. This is because one of the lookup tables, which has been selected for each pixel location, is consulted.

In one embodiment of the present invention, the lookup tables may be provided for at least some epipolar lines in the image captured by the camera. On each and every epipolar line, one-to-one correspondence is always met between the optical characteristic of the reflected light and the direction in which the light has been projected. Thus, it would be more efficient and cost effective if the lookup tables are provided for the respective epipolar lines. As a result, highly accurate 3D information can be generated with reasonable computational cost and storage capacity consumed.

In this particular embodiment, the 3D information generator may newly make a lookup table for pixels on one of the epipolar lines that is associated with none of the lookup tables by performing interpolation on at least two of the existent lookup tables associated with corresponding ones of the epipolar lines near the epipolar line on target.

As an alternative, the light source and the camera may be placed such that a line connecting the light source and the camera together matches an X-axis of a world coordinate system and is parallel to an x-axis of a camera coordinate system. In such a case, the epipolar lines are parallel to the x-axis in the image captured by the camera. As a result, the lookup tables can be made and distance can be estimated far more easily.

BRIEF DESCRIPTION OF THE DRAWINGS

FIG. 1 illustrates an arrangement of a rangefinder according to a first embodiment of the present invention.

FIG. 19(a) illustrates three linear beams associated with mutually different epipolar lines on a camera image; and FIG. 19(b) illustrates the epipolar lines resulting from the linear beams shown in FIG. 19(a).

FIG. 21(a) illustrates pattern light beams projected; and

FIG. 21(b) illustrates an epipolar line resulting from the pattern light beams shown in FIG. 21(a).

FIG. 22(a) illustrates a relationship between the light intensity ratio and the angle of rotation; and FIG. 22(b) illustrates a relationship between the light intensity ratio and the angle of elevation.

DESCRIPTION OF THE PREFERRED EMBODIMENTS

Figure 2A:
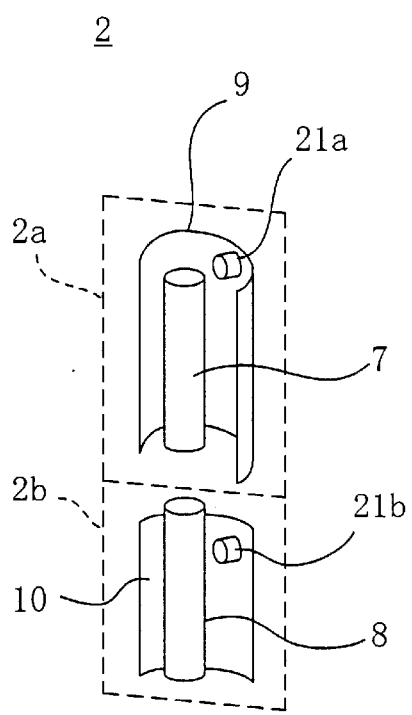
FIGS. 2(a) and 2(b) are respectively perspective view and plan view illustrating light sources for the rangefinder shown in FIG. 1.

Hereinafter, preferred embodiments of the present invention will be described with reference to the accompanying drawings.

EMBODIMENT 1

FIG. 1 illustrates an arrangement of a rangefinder according to a first embodiment of the present invention. As shown in FIG. 1, a light source section 2 includes two flash lamps 2a and 2b for projecting light onto an object 106 such that the intensity of the projected light varies on the object 106 from place to place. A camera 1 receives part of the light that has been projected from the light source section 2 and then reflected from the object 106. In response to a vertical sync signal supplied from the camera 1, a light source controller 5 gets each of the light sources 2a and 2b alternately flashed once a frame or field. A distance calculator 6, which is equivalent to the 3D information generator as defined in the appended claims, generates a range image representing the 3D information of the object 106 from an image that has been captured by the camera 1 by using the reflected light. In this specification, such an image will be called a "reflected light image".

Also, light receivers 21a and 21b are provided for the light sources 2a and 2b in the light source section 2 to detect the intensities of the light beams emitted from the light sources 2a and 2b, respectively. The light intensities that have been detected by the light receivers 21a and 21b are provided to the light source controller 5, which in turn sends these values as predetermined correction information to the distance calculator 6. In accordance with this correction information, the distance calculator 6 corrects the reflected light image and generates the range image from the corrected image.

Figure 2B:
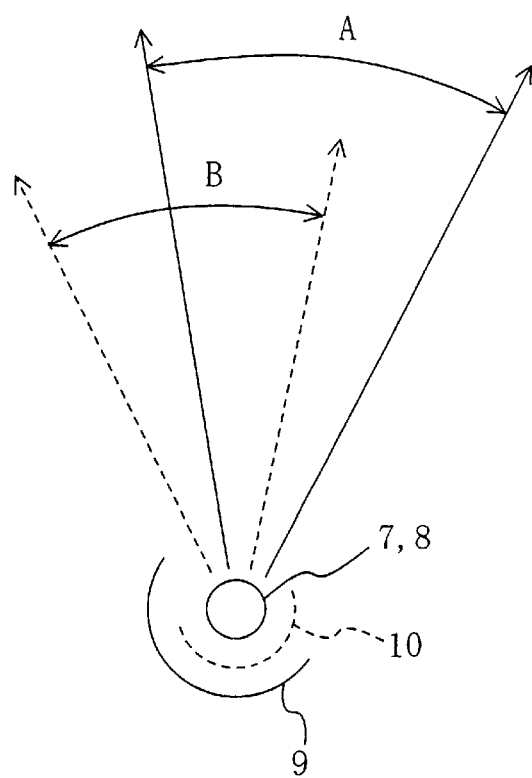

FIG. 2(a) is a perspective view illustrating exemplary configurations for the light sources 2a and 2b. As shown in FIG. 2(a), flash lamps 7 and 8 such as xenon lamps are vertically stacked such that the axes thereof are aligned with each other. Reflectors 9 and 10 are placed behind these lamps 7 and 8, respectively, such that the range of the light reflected from one of these reflectors 9 and 10 shifts from that of the light reflected from the other by a predetermined angle around the axis. The light receivers 21a and 21b are herein implemented as photodiodes provided for the reflectors 9 and 10, respectively, to detect the intensities of the light beams emitted from these light sources 2a and 2b. FIG. 2(b) is a plan view of the light sources 2a and 2b shown in FIG. 2(a). As shown in FIG. 2(b), the light sources 2a and 2b radiate, or project, the light beams within the ranges A and B, respectively. In the illustrated embodiment, the xenon lamps preferably have small emissive portions such that these lamps can be regarded as point light sources in the plan view.

Figure 3:
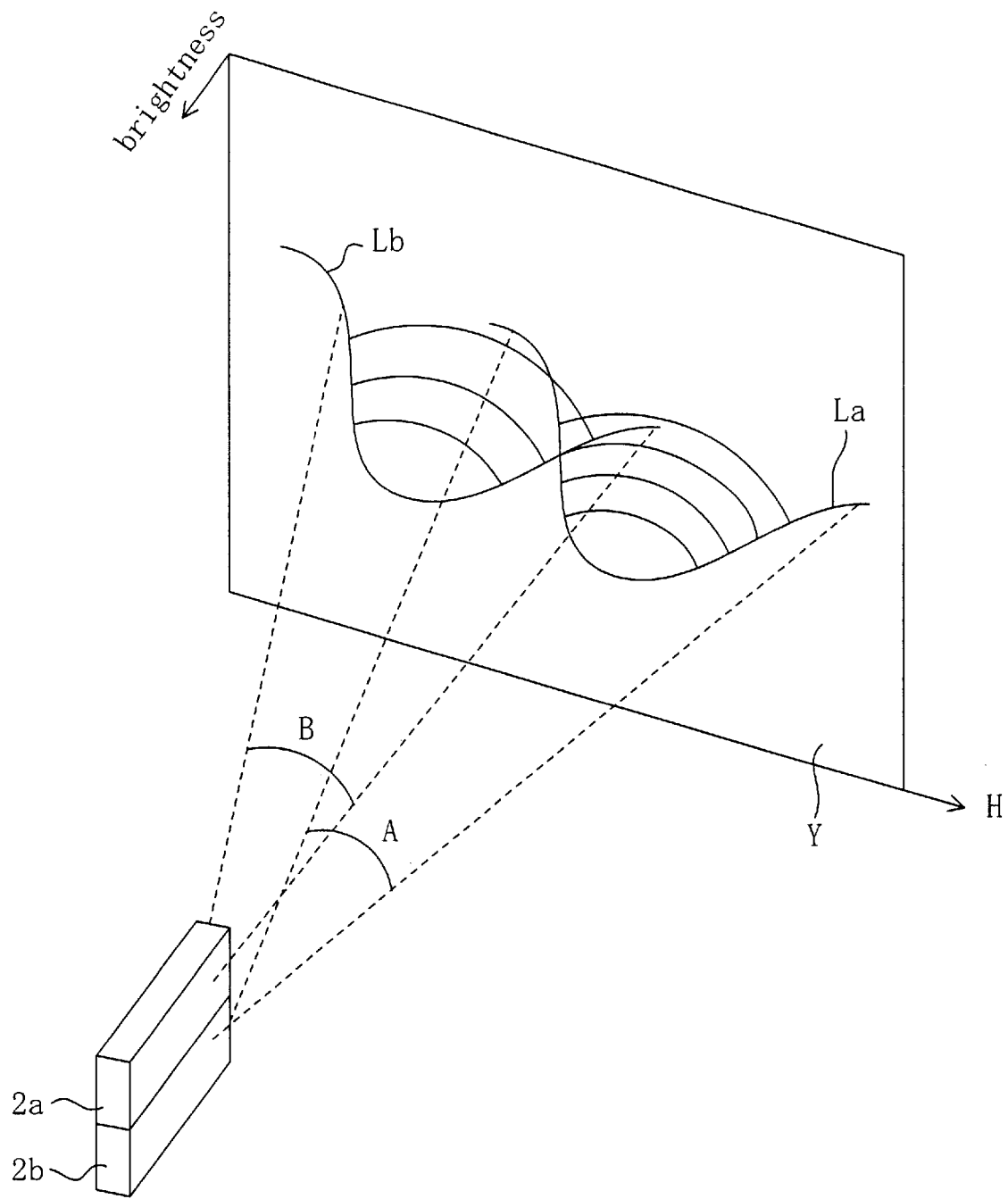
FIG. 3 illustrates light patterns that have been radiated from the light sources shown in FIGS. 2(a) and 2(b).

FIG. 3 schematically illustrates exemplary light patterns that have been radiated from the light sources 2a and 2b shown in FIG. 2. In FIG. 3, the solid lines La and Lb represent the brightness on a virtual screen Y, on which the light beams have been projected from the light sources 2a and 2b. The higher the solid lines La and Lb in the direction indicated by the arrow in FIG. 3, the brighter the light. As can be seen from FIG. 3, the light projected from each of these light sources 2a and 2b is intensest, or brightest, on the center axis of the projection range and gradually becomes weaker, or darker, toward the peripheral regions of the range. Such a distribution results from the disposition of the semi-cylindrical reflectors 9 and 10 behind the flash lamps 7 and 8, respectively. And depending on which directions these reflectors 9 and 10 face, the light beams projected from the light sources 2a and 2b may or may not partially overlap with each other.

Figure 4:
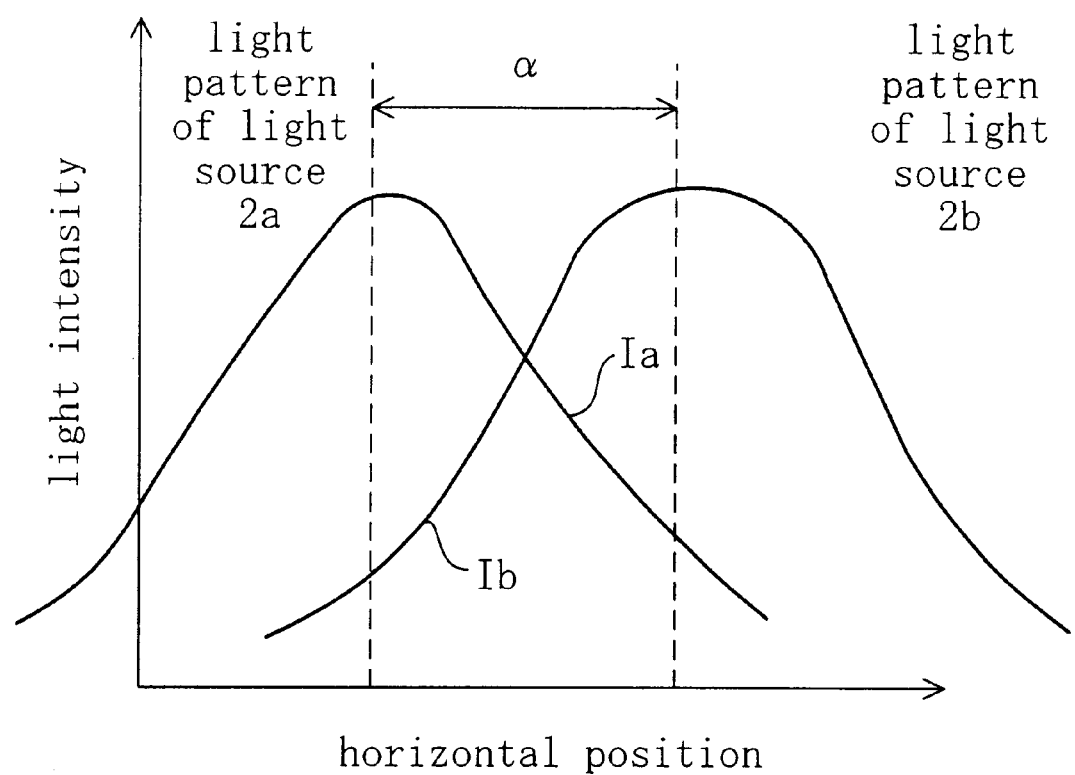
FIG. 4 is a graph illustrating a relationship between horizontal position and light intensity in the light patterns shown in FIG. 3.

FIG. 4 is a graph illustrating a relationship between a horizontal position on the virtual screen Y (i.e., in the direction H shown in FIG. 3) and the light intensity. As shown in FIG. 4, a range α of the light pattern projected from one of the light sources 2a and 2b through the space of the object has relatively bright and relatively dark parts on right- and left-hand sides of the light source 2a or 2b, respectively. Conversely, the range α of the light pattern projected from the other light source 2b or 2a through the space of the object has relatively dark and relatively bright parts on right- and left-hand sides of the light source 2b or 2a, respectively. In this case, the light intensities of the light sources 2a and 2b in the range α will be represented as Ia and Ib, respectively. It should be noted that the distributions of light intensities shown in FIG. 4 are about a plane passing through the center of the lens of the camera 1 and corresponding to a predetermined y coordinate (e.g., 0). Actually, the distributions differ depending on the y coordinate.

Figure 5:
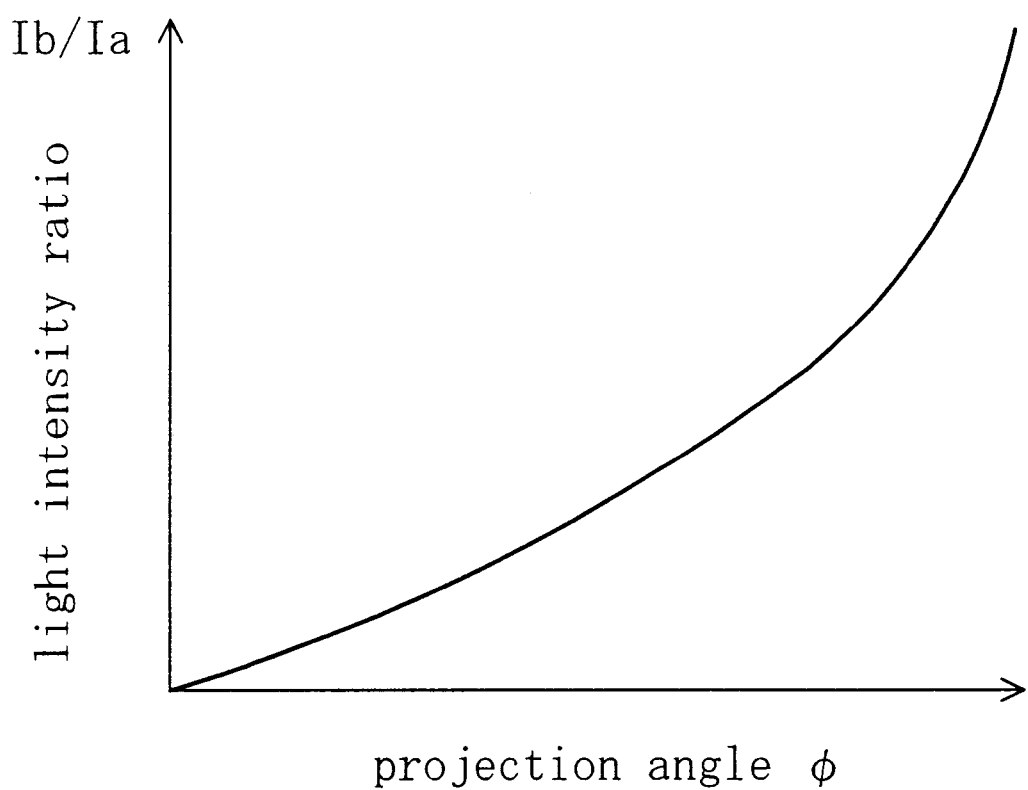
FIG. 5 is a graph illustrating a relationship between the projection angle and intensity of the light in the range α shown in FIG. 4.

FIG. 5 is a graph illustrating a relationship between the projection angle φ of the light outgoing from the light source section 2 and a light intensity ratio Ib/Ia in the range α shown in FIG. 4. As shown in FIG. 5, there is a substantially linear relationship between the light intensity ratio Ib/Ia and the projection angle φ of the light in the range α.

To measure the distance of the object, two types of light patterns should be projected in advance onto a plane standing vertically and the light beams that have been reflected from the plane should be received by the camera 1. The relationship between the light intensity ratio and the projection angle of the light such as that shown in FIG. 5 should be obtained in advance for each y coordinate. And the light source section 2 should be disposed such that a line connecting the center of the lens of the camera 1 to the light source section 2 is parallel to the x-axis of the image plane. In such a case, the distance of the object can be estimated accurately based on the data representing the relationships between the light intensity ratios and projection angles of the light associated with respective y coordinates.

Figure 6:
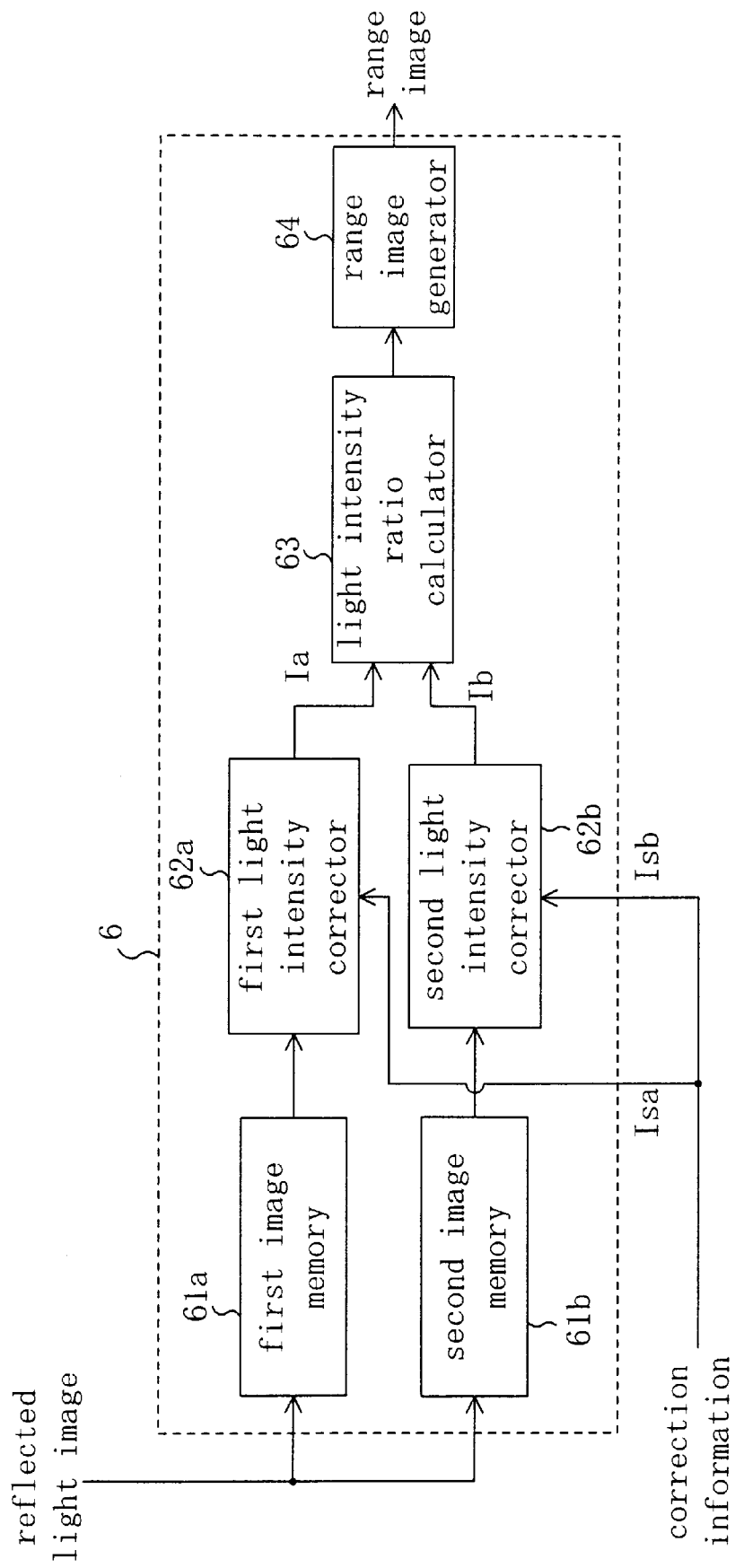
FIG. 6 is a block diagram illustrating an exemplary internal configuration for the distance calculator in the rangefinder shown in FIG. 1.

FIG. 6 illustrates an exemplary internal configuration for the distance calculator 6. As shown in FIG. 6, the distance calculator 6 includes first and second image memories 61a and 61b, first and second light intensity correctors 62a and 62b, a light intensity ratio calculator 63 and a range image generator 64. Image signals representing the reflected light images captured by the camera 1 are temporarily stored on the first and second image memories 61a and 61b on a frame-by-frame basis. The first and second light intensity correctors 62a and 62b correct the light intensities represented by the image signals stored on the first and second image memories 61a and 61b, respectively, according to the correction information. The light intensity ratio calculator 63 calculates the ratio of the light intensities that have been corrected by the first and second light intensity correctors 62a and 62b. And based on the light intensity ratio obtained, the range image generator 64 generates a range image of the object 106.

An image signal representing a reflected part of the light projected from the light source 2a is stored on the first image memory 61a. On the other hand, an image signal representing a reflected part of the light projected from the light source 2b is stored on the second image memory 61a. The light intensity detected by the light receiver 21a is provided as correction information Isa to the first light intensity corrector 62a, while the light intensity detected by the light receiver 21b is provided as correction information Isb to the second light intensity corrector 62b.

Furthermore, reference values Ira and Irb used for correcting the light intensities are stored in advance on the first and second light intensity correctors 62a and 62b, respectively. Each of the reference values Ira and Irb may be an average of intensities that have been actually measured several times by the light receiver 21a or 21b for the light beam projected from the light sources 2a or 2b.

Hereinafter, it will be described how the rangefinder according to this embodiment estimates the distance of the object. In the following description, it will be exemplified how to calculate the depth Z (i.e., Z coordinate) of a point P of the object 106 shown in FIG. 1. In particular, it will be described in further detail how the distance calculator 6 corrects the light intensity.

Figure 7:
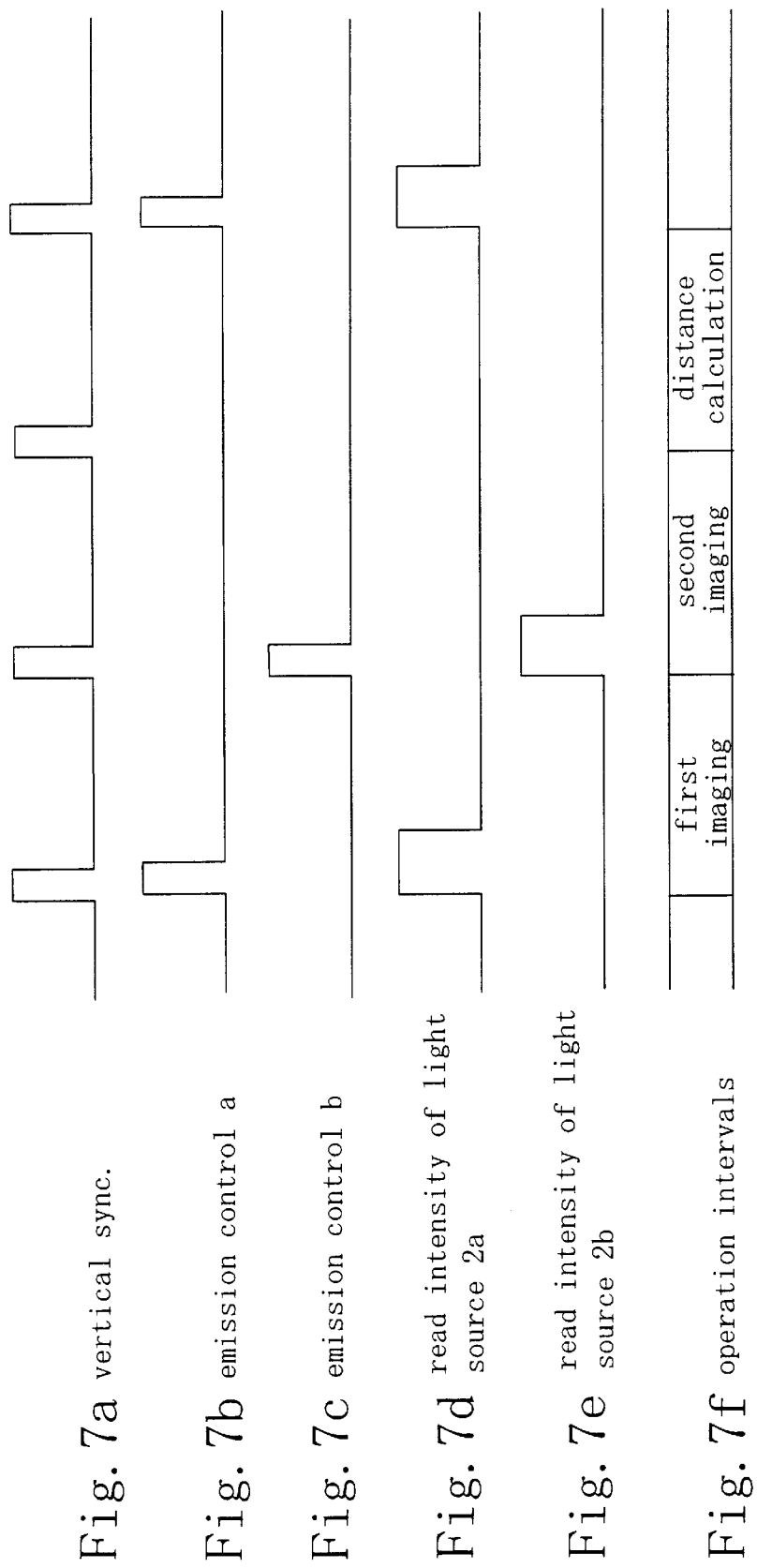
FIGS. 7a–7f are timing diagrams illustrating how the rangefinder shown in FIG. 1 operates.

FIG. 7 is a timing diagram illustrating how the rangefinder operates in accordance with this embodiment.

As shown in FIG. 7, in response to the vertical sync signal (shown in portion (a) of FIG. 7) provided from the camera 1, the light source controller 5 alternately outputs emission control signal a or b (shown in portions (b) and (c) of FIG. 7) at regular intervals (e.g., once a frame or field), thereby getting the light sources 2a and 2b flashed one after the other. The light receivers 21a and 21b detect the intensities of the light beams emitted from the light sources 2a and 2b by turns. And the light intensities detected by the light receivers 21a and 21b are supplied to the light source controller 5 at respective times shown in portions (d) and (e) of FIG. 7.

The camera 1 captures the reflected light images on a time-sharing basis. Specifically, the camera 1 captures a reflected light image resulting from the light projected from the light source 2a during a first imaging interval, and then captures a reflected light image resulting from the light projected from the light source 2b during a second imaging interval. The reflected light image corresponding to the light projected from the light source 2a is written on the first image memory 61a, while the reflected light image corresponding to the light projected from the light source 2b is written on the second image memory 61b.

The light source controller 5 sends the data, which represents the light intensity of the light source 2a that has been detected by the light receiver 21a, as the correction information Isa to the light intensity corrector 62a of the distance calculator 6. In the same way, the light source controller 5 sends the data, which represents the light intensity of the light source 2b that has been detected by the light receiver 21b, as the correction information Isb to the light intensity corrector 62b.

Then, the distance calculator 6 generates a range image.

First, the light intensity correctors 62a and 62b correct the reflected light images that have been written on the image memories 61a and 61b using the correction information Isa and Isb supplied from the light source controller 5 and the reference values Ira and Irb stored beforehand.

That is to say, the light intensity corrector 62a calculates a conversion ratio Ira/Isa of the pre-stored reference value Ira to the correction information Isa, and then multiplies the light intensity data of the reflected light image stored on the image memory 61a by this conversion ratio Ira/Isa. The product is output as corrected light intensity Ia to the light intensity ratio calculator 63. In the same way, the light intensity corrector 62b calculates a conversion ratio Irb/Isb of the pre-stored reference value Irb to the correction information Isb, and then multiplies the light intensity data of the reflected light image stored on the image memory 61b by this conversion ratio Irb/Isb. The product is output as corrected light intensity Ib to the light intensity ratio calculator 63.

Then, the light intensity ratio calculator 63 calculates a light intensity ratio Ib/Ia of the corrected light intensities Ia and Ib and then outputs the ratio Ib/Ia to the range image generator 64.

In accordance with the relationship shown in FIG. 5 between the light intensity ratio Ib/Ia and the projection angle φ and the relationship between the x coordinate of a pixel and the angle θ, the range image generator 64 identifies the angles θ and φ for every pixel, thereby obtaining the distance Z and outputting a range image.

In the range image generator 64, relationships between the light intensity ratios and the projection angles φ such as that shown in FIG. 5 are defined in advance for all y coordinates through actual measurements. The range image generator 64 selects one of the relationships between the light intensity ratios and the angles φ, which is associated with the y coordinate of the point P, thereby identifying the projection angle φ corresponding to the point P. Also, the range image generator 64 obtains the angle θ formed by a visual axis, which extends from the center of the camera 1 to the point P, with the X-axis based on the coordinates of a pixel associated with the point P and various camera parameters including focal length f and coordinates of the optical center of the lens system. Then, the range image generator 64 estimates the depth Z of the point P by the triangulation technique using the two angles obtained θ and φ and a baseline length D, i.e., the distance between the position of the light source and the optical center of the camera.

Suppose the optical center of the camera 1 is defined as the origin O of the coordinate system; the optical axis of the camera 1 as the Z-axis thereof; horizontal and vertical directions as the X- and Y-axes thereof; an angle formed by a visual axis extending from the light source 2 to the point P with the X-axis as φ; an angle formed by a visual axis extending from the camera 1 to the point P with the X-axis as θ; and the coordinates of the light source 2 are (-D, 0, 0) (i.e., the baseline length is D). Then, the depth Z of the point P is given by the following Equation (1):

$$Z = D \cdot \tan\theta \cdot \tan\phi / (\tan\theta - \tan\phi) \quad (1)$$

If the intensity of the reflected light image captured by the camera 1 is corrected according to the correction information in this manner, an even more accurate range image can be obtained.

Figure 8:
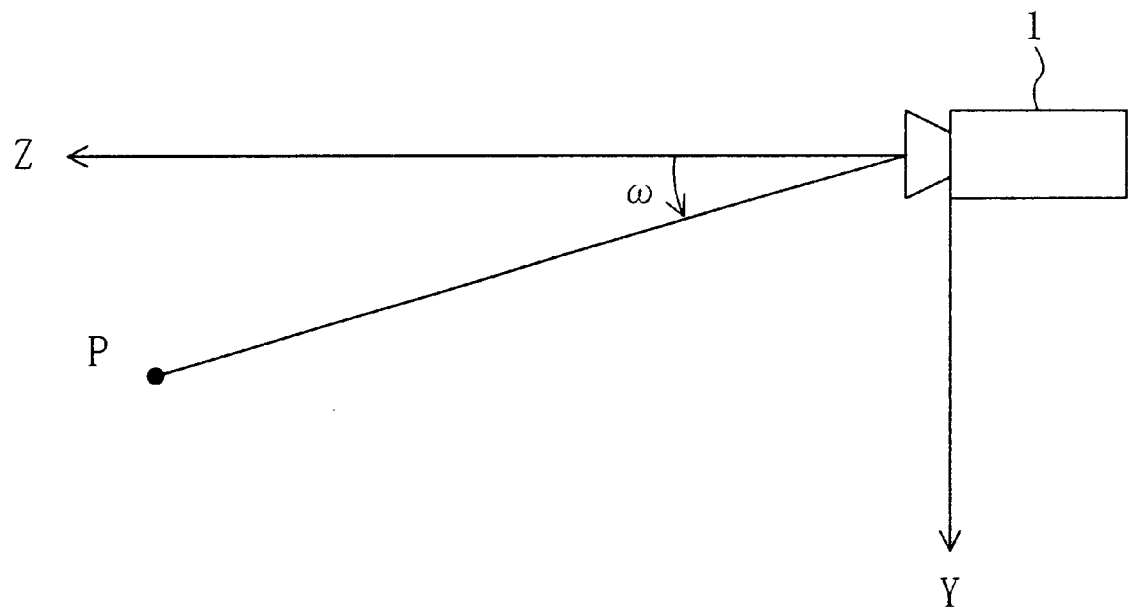
FIG. 8 schematically illustrates the concept of an angle ω used for obtaining 3D coordinates X, Y and Z.

In the foregoing embodiment, the distance calculator 6 calculates the distance Z as the only item of 3D information and outputs the result of this computation as a range image. Alternatively, all of the 3D coordinates (X, Y, Z) of the point P may be calculated by the following Equations (2) using the angle ω shown in FIG. 8 and output as the 3D information of the object.

$$X = Z / \tan\theta$$
$$Y = Z \cdot \tan\omega \quad (2)$$

In the foregoing embodiment, the light intensity corrector 62a or 62b makes the correction simply by multiplying the light intensity data by the conversion ratio Ira/Isa or Irb/Isb. However, offset processing is preferably performed before this multiplication.

For example, offset processing may be performed on the reflected light image data stored on the image memory 61a or 61b by subtracting black level components (e.g., "10") from the image data. And then the image data is multiplied by the conversion ratio Ira/Isa or Irb/Isb. The values of the black level components should be estimated in advance just once. If such processing is performed, then the error of measurement may be reduced to about 10% compared to non-corrected data even if the emission intensity of the light source has varied by about 5%. That is to say, the correction can be made far more accurately.

The offset processing may also be performed by subtracting the intensity of the reflected light image when no light is projected (i.e., when there is nothing but background light), not the black level components. In such a case, not only the effects of the background light but also those of the black level components can be compensated for, thus realizing even more accurate correction.

Figure 9:
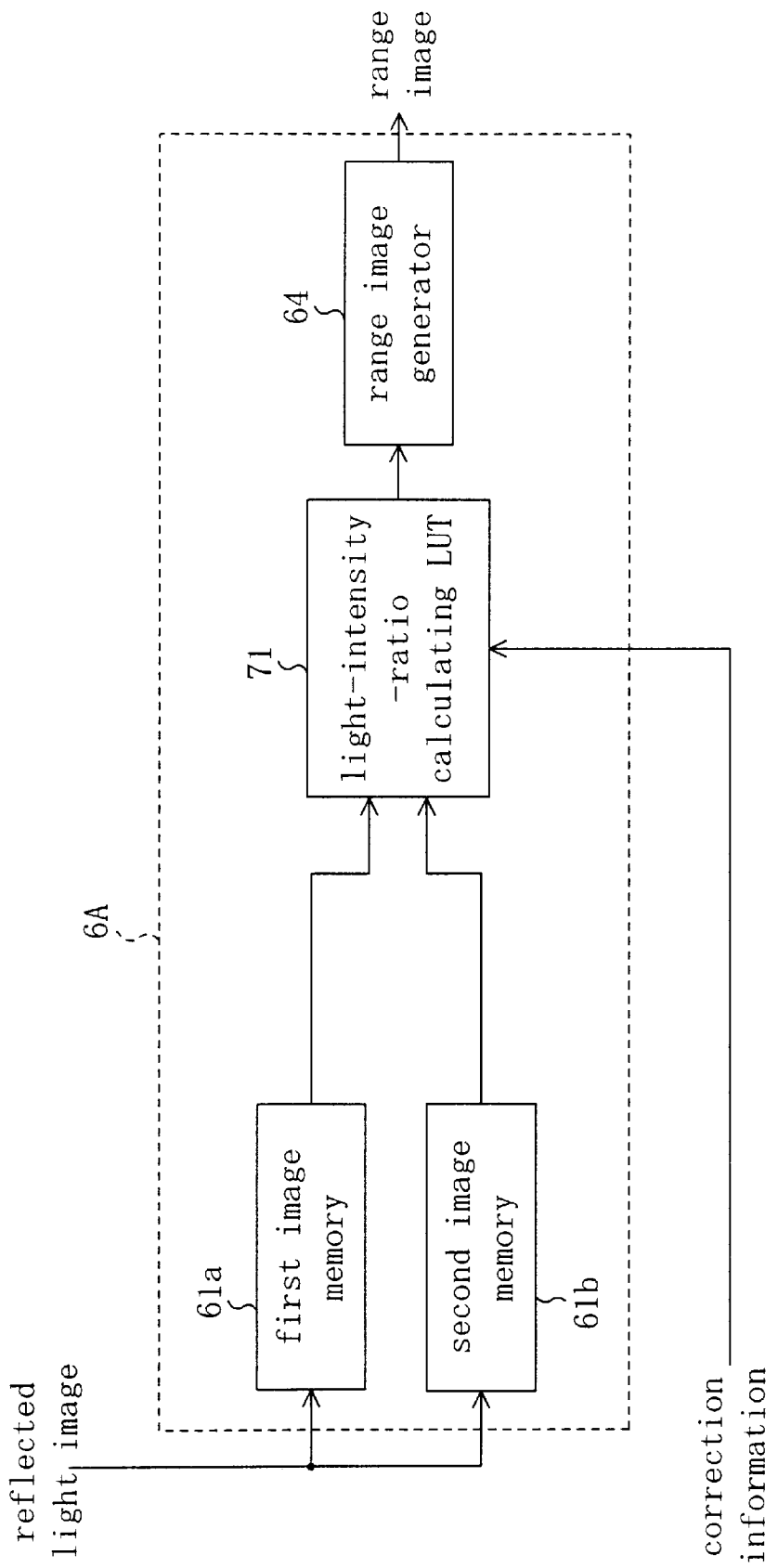
FIG. 9 is a block diagram illustrating another exemplary internal configuration for the distance calculator in the rangefinder shown in FIG. 1.

FIG. 9 illustrates another exemplary internal configuration for the distance calculator. The distance calculator 6A shown in FIG. 9 includes, as an alternate light intensity corrector, a light-intensity-ratio-calculating LUT section 71 instead of the light intensity correctors 62a and 62b and the light intensity ratio calculator 63 shown in FIG. 6. In the LUT section 71, multiple lookup tables (LUT's) are stored for respective conversion ratios.

In the distance calculator 6A shown in FIG. 9, LUT's should be prepared for all the conversion ratios within a range needed to calculate the light intensity ratios such that every possible correction information supplied from the light source controller 5 can be processed. For example, if the emission intensities of the light sources 2a and 2b are variable with respect to the reference light intensities by ±5%, then the LUT's should be provided for all the conversion ratios in the range from 0.95 to 1.05. In each of the LUT's, data about the ratio of light intensities that have been corrected by the associated conversion ratio is stored for the data about the original light intensities.

The LUT section 71 obtains a conversion ratio to be adopted for correction according to the correction information provided from the light source controller 5 and selects one of the LUT's associated with the conversion ratio obtained. Subsequently, the LUT section 71 extracts the light intensity data from the respective image memories 61a and 61b on a pixel-by-pixel basis, thereby directly obtaining a corrected light intensity ratio for each item of the light intensity data by reference to the selected LUT. Then, the LUT section 71 outputs the ratios to the range image generator 64.

In the foregoing embodiment, the light sources 2a and 2b are flashed on the time-sharing basis. Alternatively, these light sources 2a and 2b may be flashed at the same time. In such a case, the measuring time can be shortened. However, the light beams emitted from the light sources 2a and 2b should have mutually different wavelengths and filters should be provided for the camera 1 to selectively receive the light beams with those particular wavelengths.

Also, in the foregoing embodiment, the light receivers 21a and 21b are provided inside the light sources 2a and 2b, respectively. optionally, these light receivers 21a and 21b may be provided somewhere outside of the light sources 2a and 2b so long as the light intensities of the light sources 2a and 2b can be detected.

Modified Example of Embodiment 1

In the foregoing embodiment, the light receivers 21a and 21b are provided to detect the light intensities of the light sources 2a and 2b and thereby obtain the predetermined correction information. However, the light receivers do not have to be provided to obtain the correction information.

Figure 10:
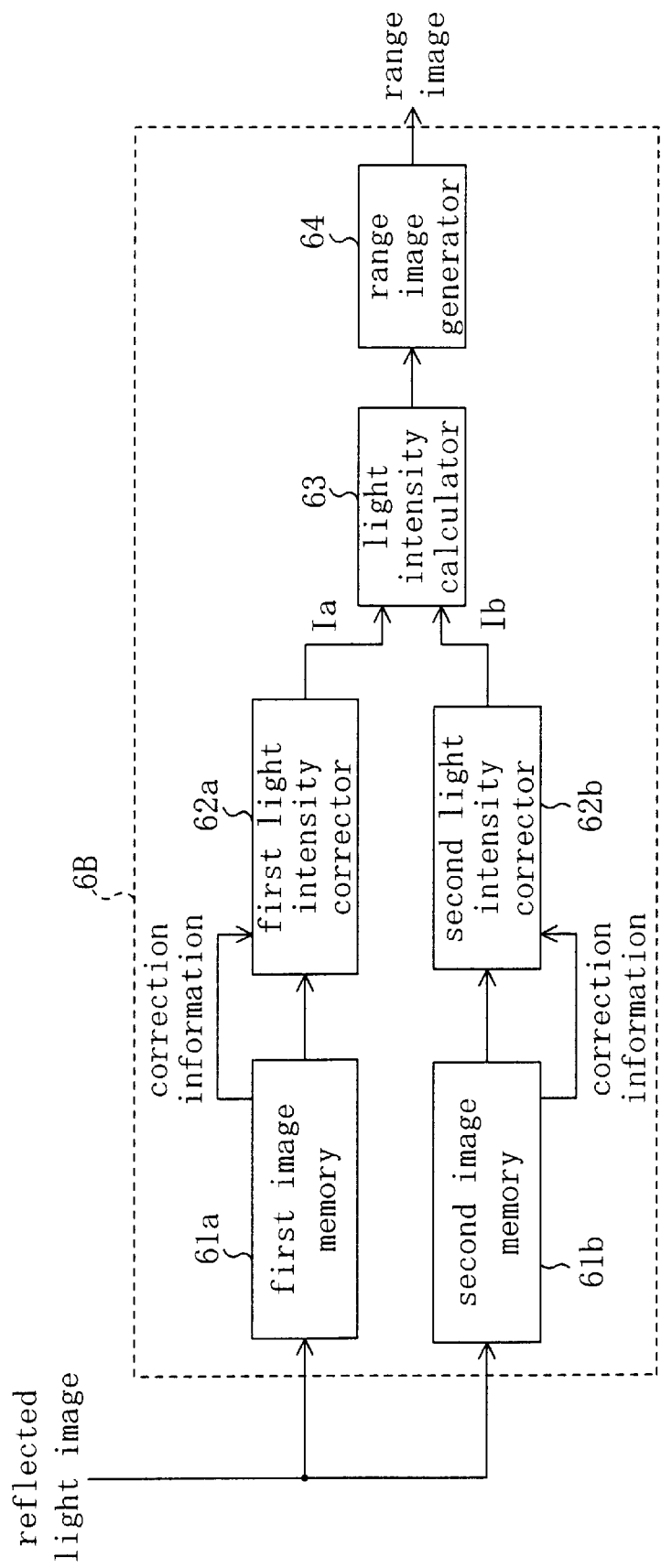
FIG. 10 is a block diagram illustrating an exemplary internal configuration for a distance calculator according to a modified example of the first embodiment.

FIG. 10 illustrates an exemplary internal configuration for a distance calculator according to a modified example of the first embodiment. In this modified example, brightness in a predetermined region of the image captured by the camera 1 is used as the correction information. Specifically, the first light intensity corrector 62a uses, as the correction information, the brightness in a predetermined region of the captured image stored on the first image memory 61a. On the other hand, the second light intensity corrector 62b uses, as the correction information, the brightness in a predetermined region of the captured image stored on the second image memory 61b. For example, an object with a reference brightness such as that of white paper may be disposed within an imaging area and the brightness of the object in the image captured may be used as the correction information.

EMBODIMENT 2

Figure 11:
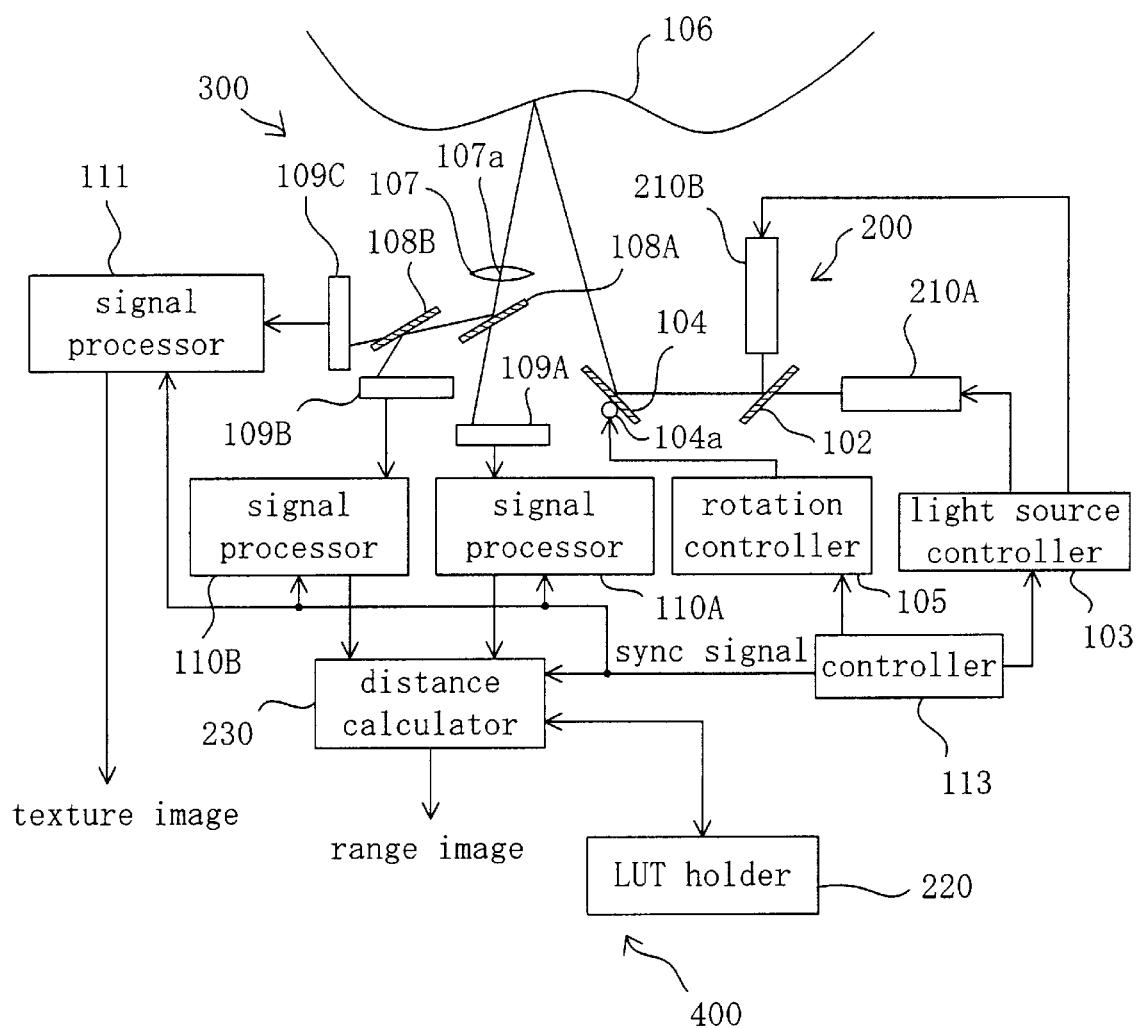
FIG. 11 illustrates an arrangement of a rangefinder according to a second embodiment of the present invention.
Figure 24:
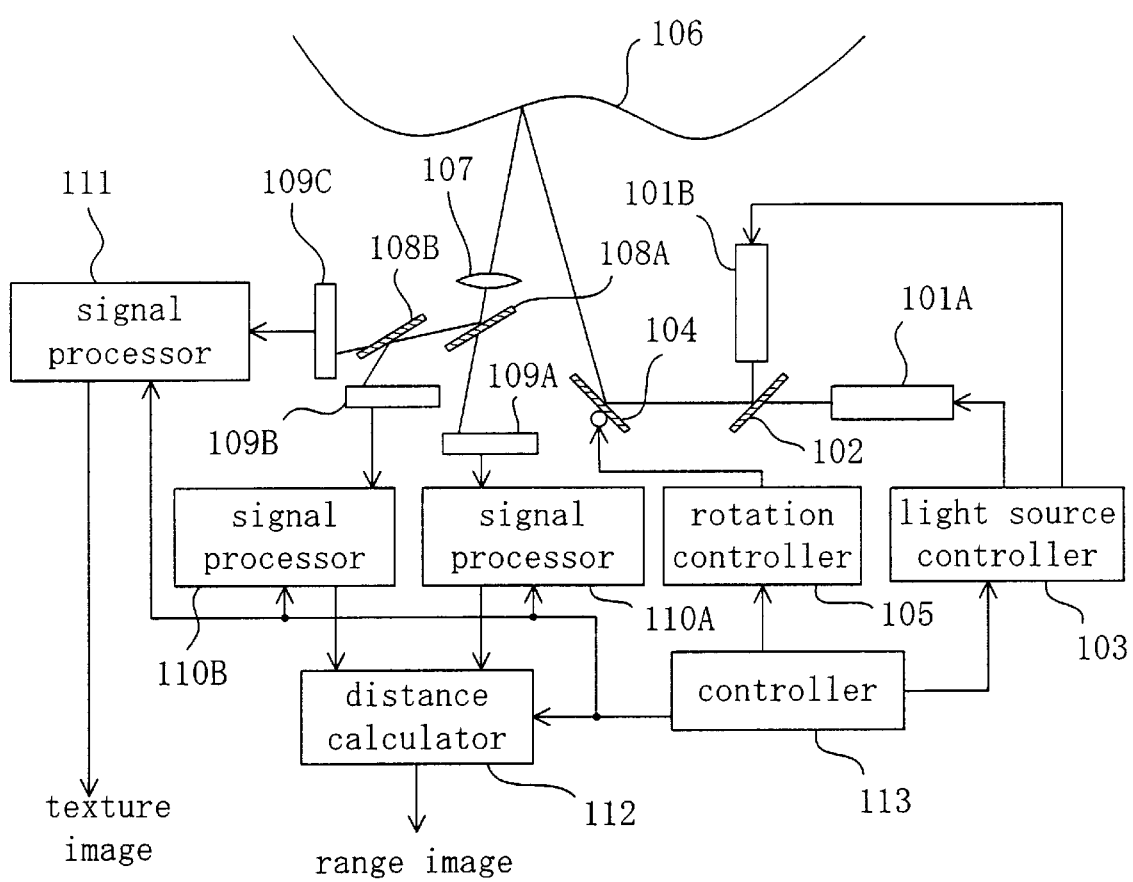
FIG. 24 is a block diagram illustrating an arrangement of a prior art rangefinder.

FIG. 11 illustrates an arrangement of a rangefinder according to a second embodiment of the present invention. In FIG. 11, the same components as those of the prior art rangefinder shown in FIG. 24 are identified by the same reference numerals and the description thereof will be omitted herein. As shown in FIG. 11, this rangefinder includes laser light sources 210A and 210B. A light source section 200 is made up of these laser light sources 210A and 210B, half mirror 102 and rotating mirror 104. A camera section 300 is made up of the lens 107, wavelength separating filters 108A and 108B, CCD's 109A and 109B and signal processors 110A and 110B.

In the following description, the x-y coordinate system will be used as a coordinate system for the visual field of a camera and the X-Y-Z coordinate system will be used as a coordinate system in real-world space to represent a 3D position. In this specification, these coordinate systems will be simply referred to as "camera coordinate system" and "world coordinate system", respectively.

Figure 12A:
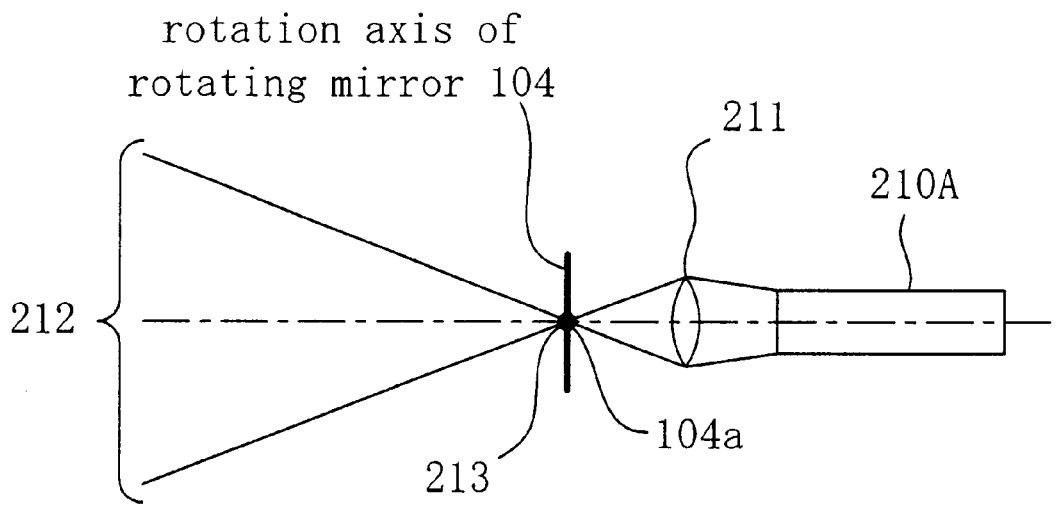
FIGS. 12(a) and 12(b) illustrate an optical system for the light sources of the rangefinder shown in FIG. 11.
Figure 12B:
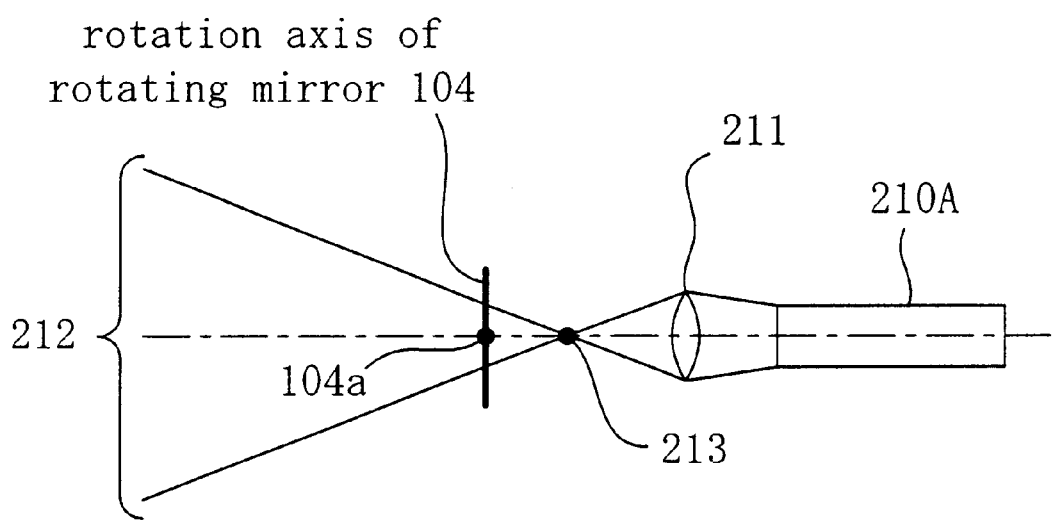

FIGS. 12(a) and 12(b) illustrate an optical system for the light source 210A of the rangefinder shown in FIG. 11. In FIGS. 12(a) and 12(b), a lens 211 is disposed between the laser light source 210A and the rotating mirror 104. The lens 211 transforms the luminous flux emitted from the light source 210A into a slitlike light beam 212 and focuses the luminous flux on the center 104a of the rotating mirror 104. The same optical system is also provided for the other light source 210B.

The optical system shown in FIG. 12(a) is in an ideal state, in which the focus 213 of the slitlike light beam 212 matches the center 104a of the rotating mirror 104. Actually, though, the focus 213 of the slitlike light beam 212 does not always match the center 104a of the rotating mirror 104 as in the optical system shown in FIG. 12(b). In such a case, the gap between the focus 213 and the center 104a might cause an error in distance measurement theoretically speaking. However, this gap can be relatively small and substantially negligible in practice, because the lookup table (LUT) is prepared such that an estimated distance of a reference plane matches a known Z coordinate.

As shown in FIG. 11, the rangefinder further includes an LUT holder 220, in which multiple LUT's are stored. Each of these LUT's represents one-to-one correspondence between the intensity ratio of reflected parts of the light beams projected from the light sources 210A and 210B and the rotation angle of the rotating mirror (i.e., the projection angle of the light beams outgoing from the light sources 210A and 210B). The distance calculator 230 selects one of the LUT's stored on the LUT holder 220 for each pixel location in the image captured by the camera, thereby generating a range image as 3D information using the LUT selected. A 3D information generator 400 is made up of the LUT holder 220 and the distance calculator 230.

Figure 13:
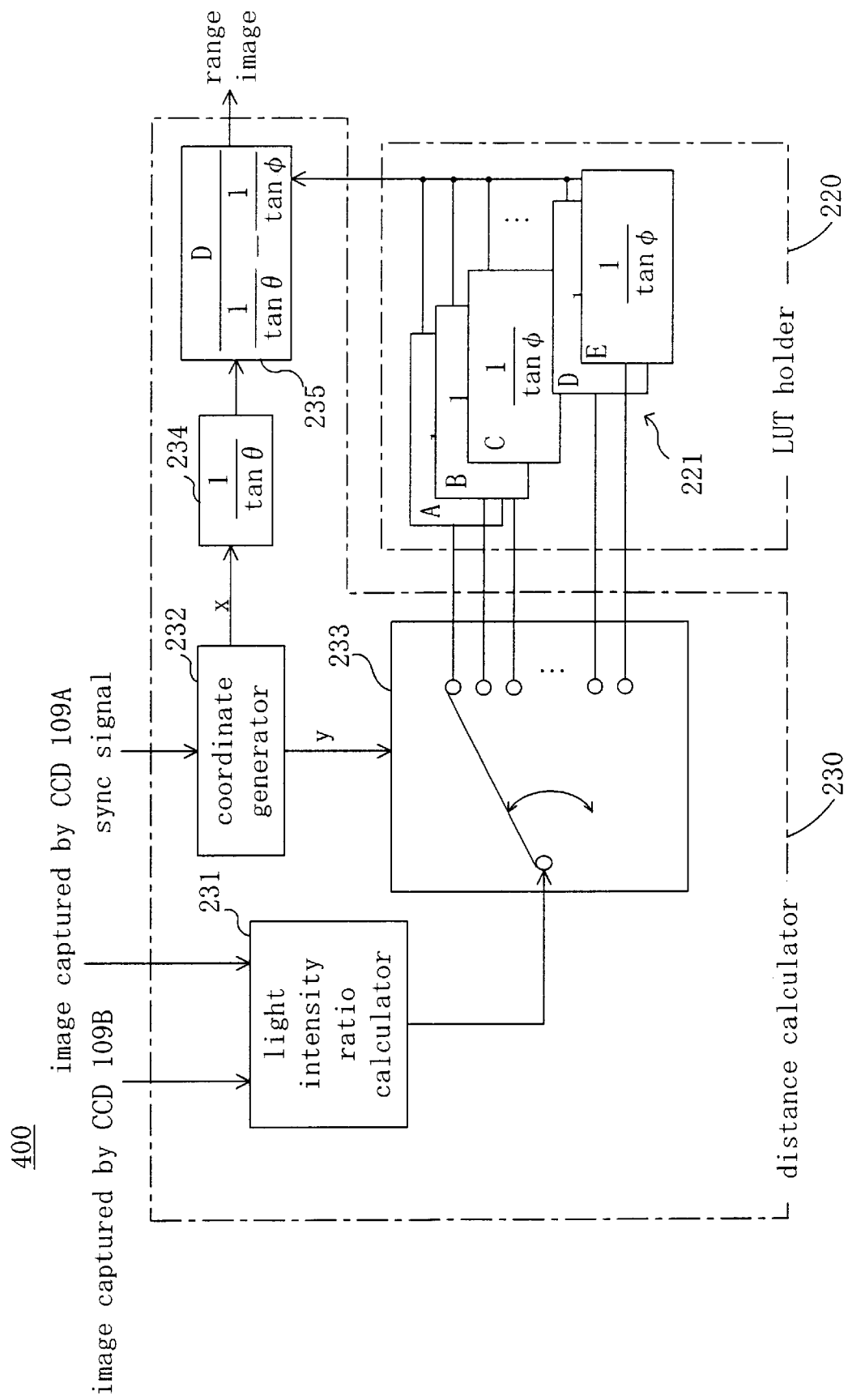
FIG. 13 is a block diagram illustrating respective internal configurations for the LUT holder and distance calculator in the rangefinder shown in FIG. 11.

FIG. 13 illustrates respective internal configurations for the LUT holder 220 and distance calculator 230. A light intensity ratio calculator 231 calculates a light intensity ratio in accordance with the data representing the images captured by the CCD's 109A and 109B on a pixel-by-pixel basis. In response to sync signals for the image data, a coordinate generator 232 generates x and y coordinates. Depending on the y coordinate generated by the coordinate generator 232, an LUT selector 233 selects one of the LUT's 221 to be consulted.

Consulting the LUT 221 selected, the light intensity ratio obtained by the light intensity ratio calculator 231 is converted into projection angle information 1/tan φ. On the other hand, a converter 234 converts the x coordinate, which has been generated by the coordinate generator 232, into camera angle information 1/tan θ. Using the baseline length D and the angle information 1/tan θ and 1/tan φ, a depth calculator 235 obtains the Z coordinate by the following Equation (3):

$$Z = \frac{D}{\frac{1}{\tan\theta} - \frac{1}{\tan\phi}} \quad (3)$$

Equation (3) is obtained by dividing the denominator and numerator of the right side of Equation (1) by tan θ·tan φ and is essentially the same as Equation (1). However, both θ and φ are set to the vicinity of 90 degrees during actual measurement. Thus, higher computational stability is attainable by using 1/tan θ and 1/tan φ as angle information than by using tan θ and tan φ, because tan θ and tan φ are indefinite when θ and φ are equal to 90 degrees.

Supposing an item of light intensity data is composed of 8 bits and an item of projection angle information 1/tan φ output from each LUT 221 is made up of 2 bytes, the size of a single LUT 221 is approximately 130 KB ($\approx 2^8 \times 2^8 \times 2$).

Hereinafter, it will be described how the rangefinder operates in accordance with the second embodiment. The 3D coordinates (X, Y, Z) are obtained basically as already described with reference to FIG. 27. The operation of this rangefinder is characterized by selectively using one of the LUT's for each pixel location in the camera image in deriving the projection angle φ of the light.

Figure 14:
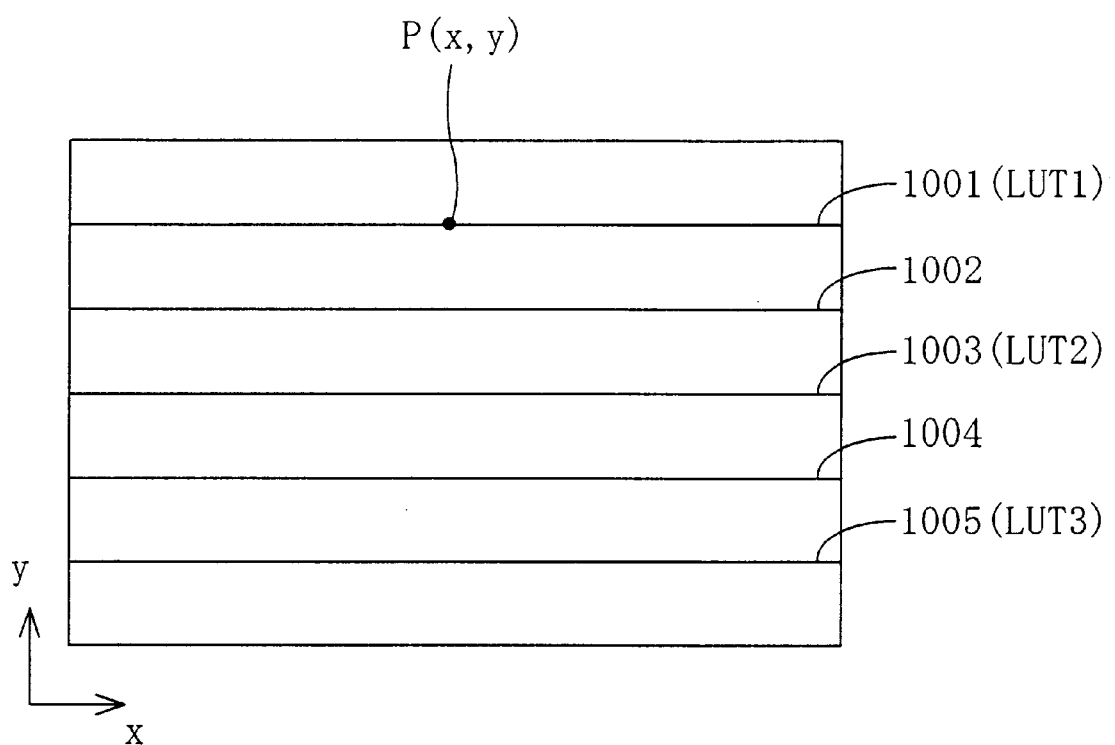
FIG. 14 schematically illustrates a correspondence between a camera image and LUT's.

FIG. 14 schematically illustrates a correspondence between a camera image and LUT's. In FIG. 14, only five CCD lines 1001 through 1005 are illustrated for the sake of simplicity. Suppose LUT's 1, 2 and 3 have been prepared for the CCD lines 1001, 1003 and 1005, respectively. In practice, LUT's may be provided for around 10 CCD lines. These LUT's should be prepared while this rangefinder is being designed or fabricated.

In this embodiment, each LUT provided is associated an epipolar line. The "epipolar line" means a line appearing on a camera image when a line in the space is imaged. In this case, the line in the space results from the linear laser light that has been projected from the light source.

Also, according to this embodiment, the camera is placed at such a position that the respective CCD lines 1001 through 1005 are aligned with these epipolar lines, i.e., such that the epipolar lines extend horizontally on the camera image. Specifically, the camera should be disposed such that the line connecting the center 107a of the camera lens 107 and the center 104a of the rotating mirror 104 is aligned with the X-axis of the world coordinate system and is parallel to the x-axis of the camera coordinate system.

In a plane corresponding to a single epipolar line within the 3D space, one-to-one correspondence is always met between the light intensity ratio and the projection angle of the light. Thus, by providing the LUT for every epipolar line, the distance can be measured highly accurately and multiple LUT's can be used very efficiently and economically even if there is a variation in the distribution of light intensities and if there is no one-to-one correspondence in the camera image between the optical characteristic of the reflected light and the direction in which the light was projected.

That is to say, the distance calculator 230 determines which LUT should be used by not only calculating the light intensity ratio for each pixel in the image captured by each CCD but also obtaining the coordinates P(x, y) of the pixel P in the camera coordinate system. For example, if the pixel P in question is located on the CCD line 1001 as shown in FIG. 14, then the LUT 1 is adopted. In the same way, if the pixel P in question is located on the CCD line 1003 or 1005, then the LUT 2 or 3 is adopted. On the other hand, if the pixel P in question is located on the CCD line 1002 with no associated LUT, then linear interpolation is carried out between the LUT's 1 and 2 provided for the nearest two CCD lines 1001 and 1003.

Figure 27A:
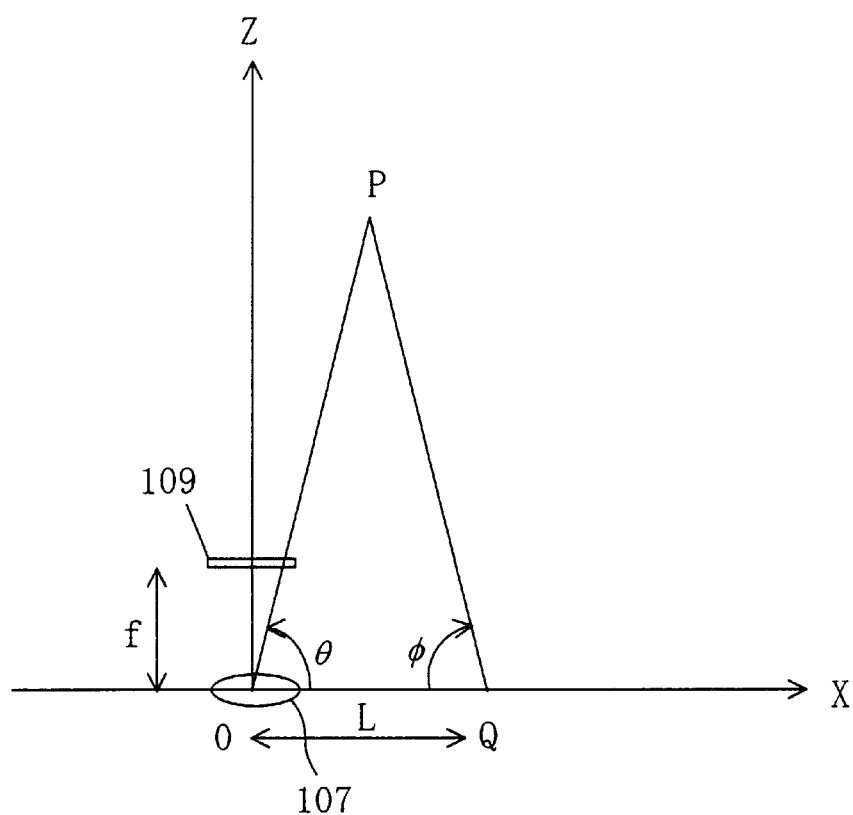
FIGS. 27(a) and 27(b) illustrate the principle of measurement performed by a rangefinder.
Figure 27B:
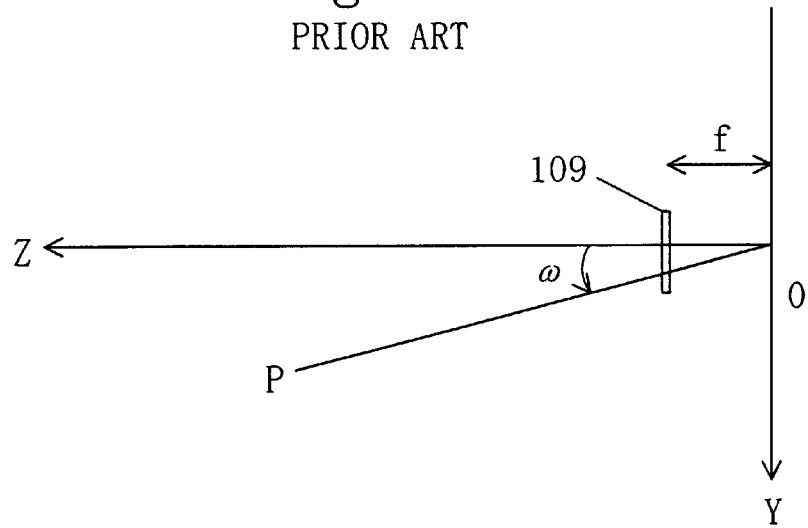

Once the projection angle has been identified by using the LUT, subsequent processing is carried out in the same manner as already described with reference to FIGS. 27(a) and 27(b). Since the best LUT is selected depending on the CCD line, or the epipolar line, on which a pixel in question is located, the distance can be calculated very accurately even if the lens system causes lens-shading effects, for example.

Next, the operating principle of the rangefinder according to the second embodiment will be described while also explaining theoretically what the epipolar line is.

Figure 15:
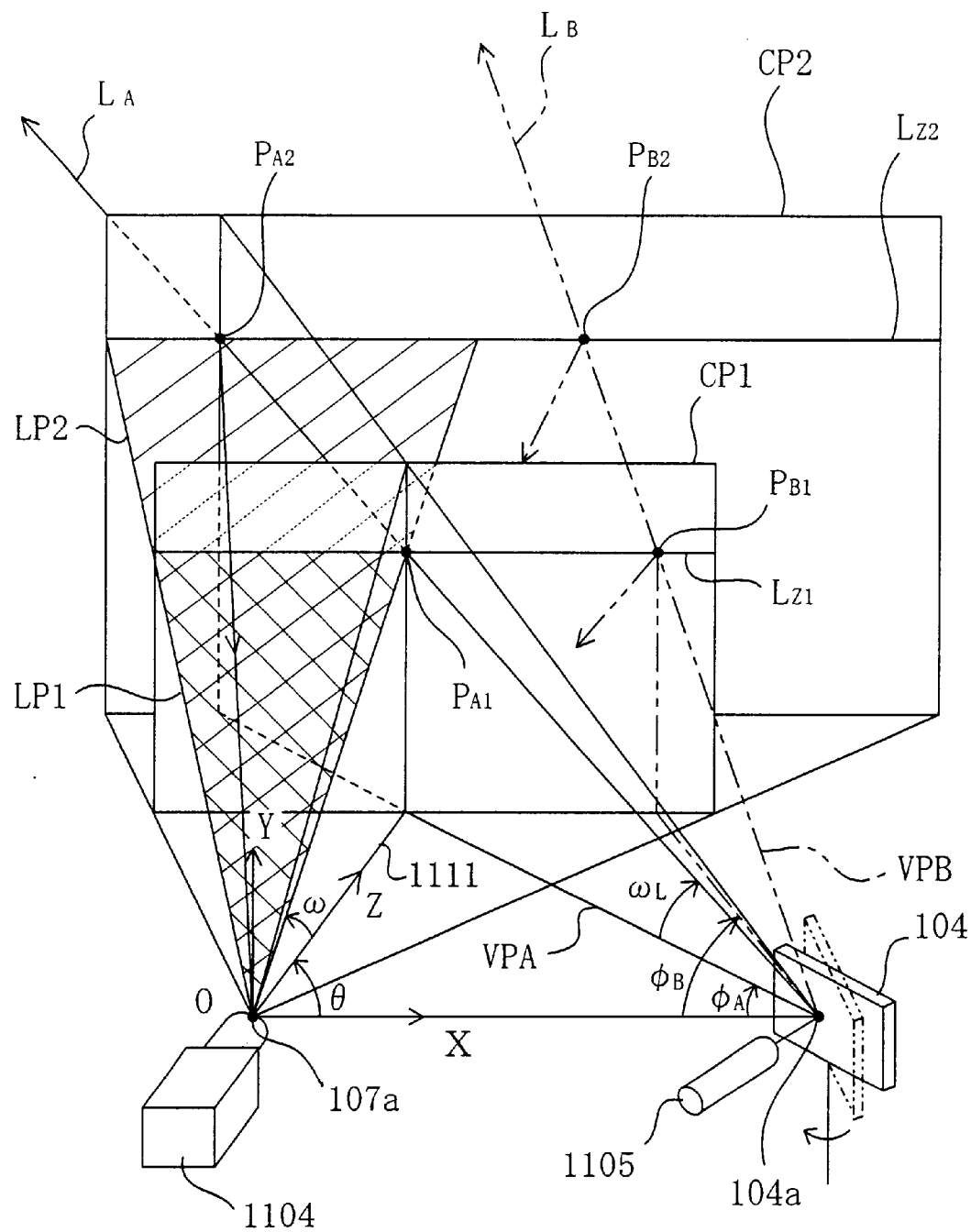
FIG. 15 is a schematic perspective view illustrating the operating principle of the rangefinder according to the second embodiment based on the world coordinate system.
Figure 16:
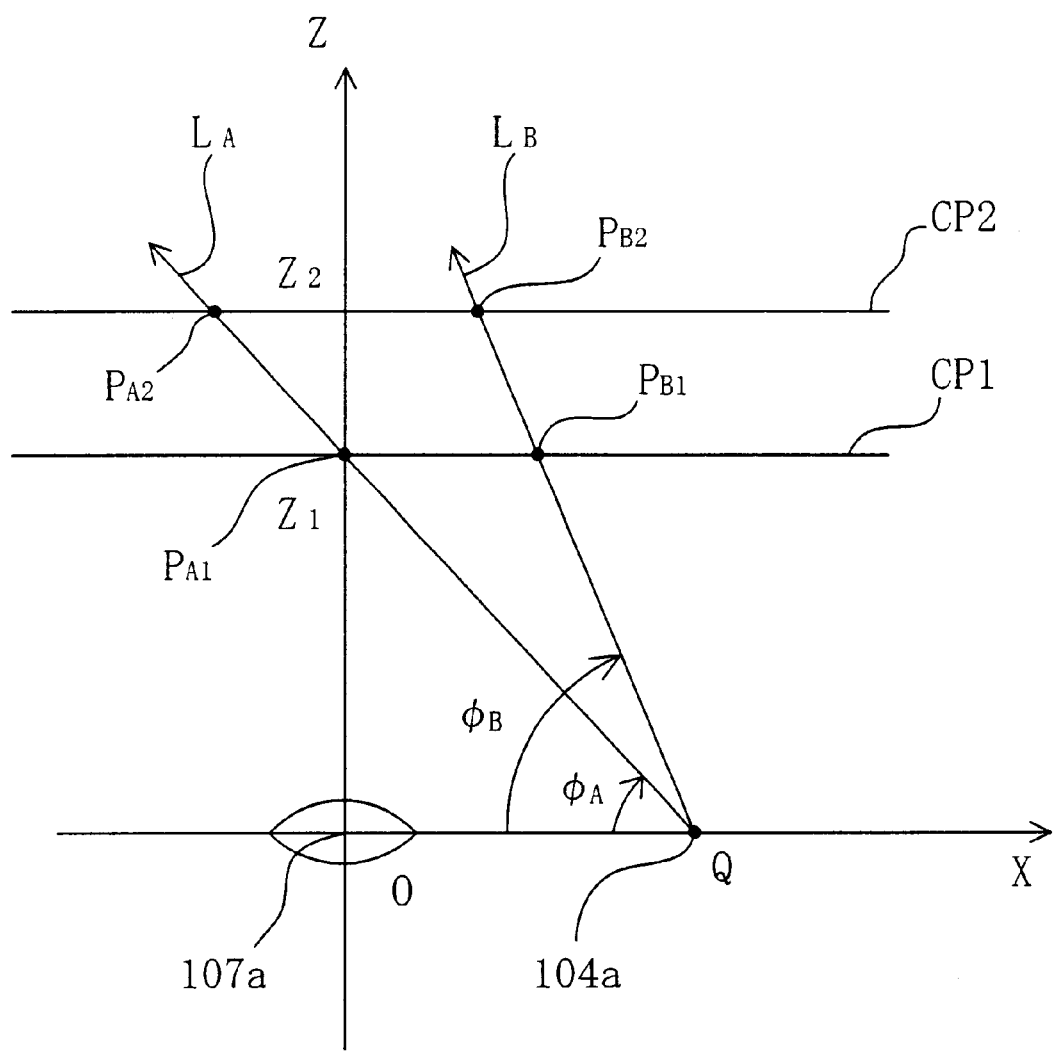
FIG. 16 is a plan view, which is a simplified version of FIG. 15.

FIG. 15 schematically illustrates the operating principle of the rangefinder according to the second embodiment based on the world coordinate system. FIG. 16 is a simplified version of FIG. 15.

Figure 25:
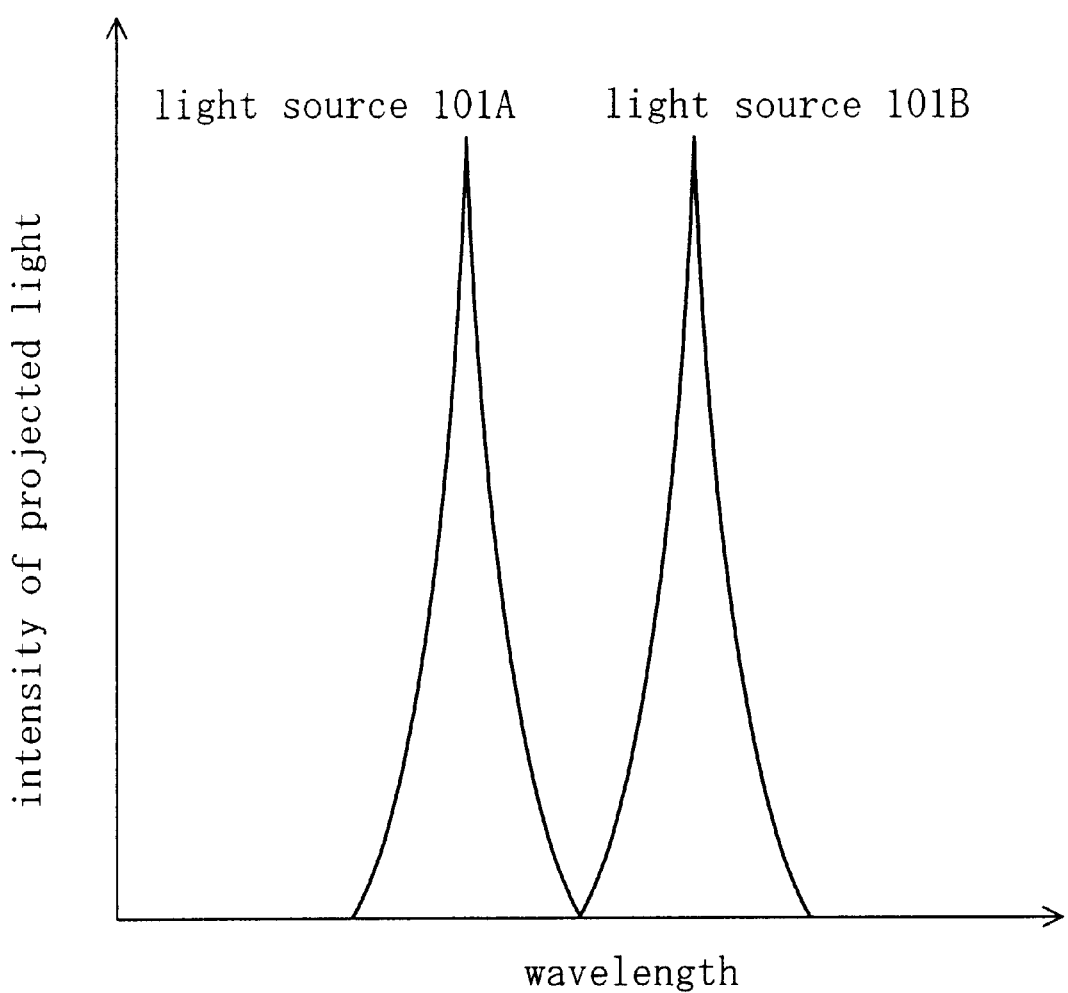
FIG. 25 is a graph illustrating how the intensities of light beams projected from light sources change with the wavelength in the prior art rangefinder.
Figure 26A:
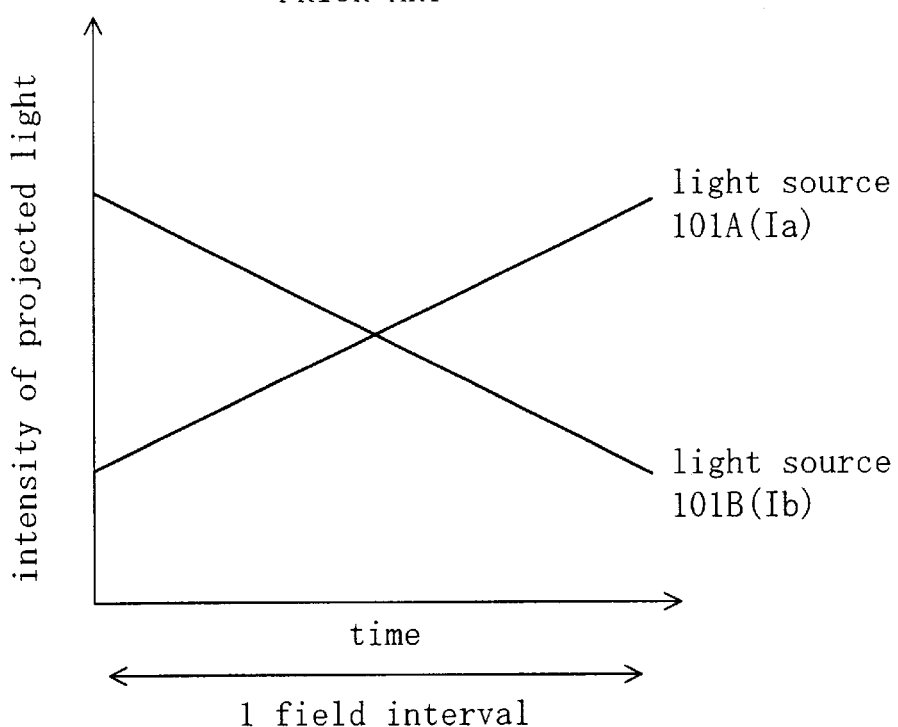
FIGS. 26(a) and 26(b) are graphs illustrating how the intensities of the light sources are modulated in the prior art rangefinder.
Figure 26B:
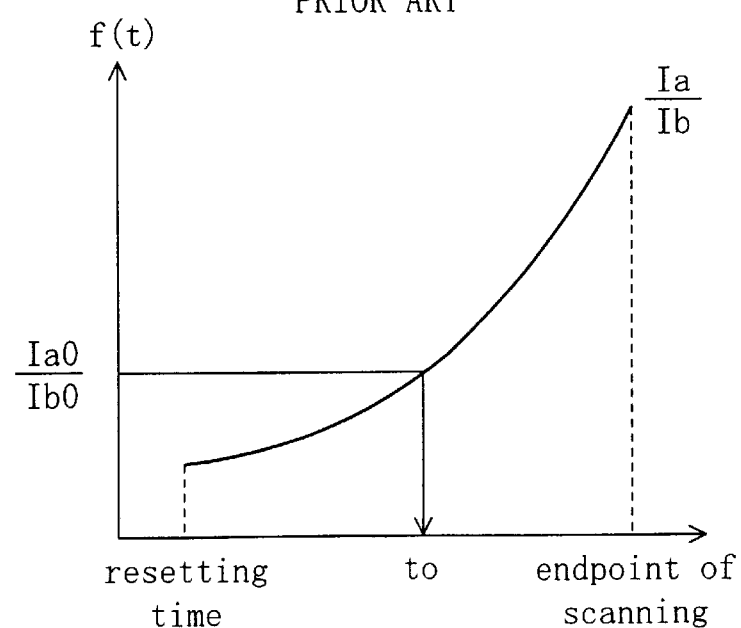

In the arrangement shown in FIGS. 15 and 16, the camera 1104 is disposed to meet the above-specified conditions. That is to say, the center 107a of the lens of the camera 1104 and the center 104a of the rotating mirror 104 are both located on the X-axis of the world coordinate system. A virtual light source 1105 is provided herein to illustrate the operating principle and to project linear laser radiation with the two types of light patterns such as those shown in FIG. 25 on a time-sharing basis.

As shown in FIG. 15 and 16, two reference planes CP1 and CP2 with Z coordinates of Z1 and Z2 (Z1<Z2), respectively, are defined. In FIG. 15, only the respective upper halves of the reference planes CP1 and CP2 within the visual field of the camera 1104 are illustrated. The illustration of the other lower half of the camera visual field is omitted in FIG. 15 for the sake of simplicity, because the lower half is symmetrical to the upper half.

In this case, an angle formed by a vertical plane including a point in question and the rotation axis of the rotating mirror 104 with the X-axis is defined as . For example, the angle formed between a vertical plane VPA including a point PA1 in question and the rotation axis of the rotating mirror 104 and the X-axis is φA, while the angle formed between a vertical plane VPB including another point PB1 in question and the rotation axis of the rotating mirror 104 and the X-axis is represented as φB.

Also, an angle formed by the projective line of a line connecting a point in question to a viewpoint (i.e., the center 107a of the lens or the center 104a of the rotating mirror) on the YZ plane with the Z-axis is herein defined as an angle of elevation ω. In the illustrated embodiment, the centers 107a and 104a of the lens and the rotating mirror are both located on the X-axis to meet the positional conditions of the camera. Thus, the angle of elevation associated with a point as viewed from the center 107a of the lens is always equal to that associated with the point as viewed from the center 104a of the rotating mirror. The angle φ is defined as shown in FIG. 15.

The linear laser radiation emitted from the light source 1105 is reflected at the center 104a of the rotating mirror and is made to sweep the object as the rotating mirror 104 rotates. Also, as the light source 1105 changes its angle, the emission angle ωL of the linear laser radiation also changes gradually. This emission angle ωL corresponds to the angle of elevation ω.

Such a light source 1105 is supposed here to represent the lens-shading effects on the light actually projected from the light source section in the Y-axis direction. That is to say, the actual light source section sweeps the object by irradiating it with a slitlike light beam in parallel to the Y-axis, and the intensity of the projected light is supposed to change only in the sweeping direction (i.e., the X-axis direction). Actually, though, a so-called "lens-shading" phenomenon occurs. Specifically, the light intensity of the slitlike light beam attenuates in the peripheral regions compared to the center region thereof. For that reason, the light source 1105 is herein supposed to project linear laser radiation and the lens-shading phenomenon occurring in the real-world light source section is reproduced using the emission angle ωL as a parameter.

If a Z coordinate of a reference plane is changed from zero to infinity by projecting a liner light beam into the space, then the points of reflection in these reference planes are captured in the camera image as a liner trace with a constant y coordinate. This linear trace corresponds to the "epipolar line".

Next, consider an intensity ratio ρ (=Ia/Ib) of two light beams that are alternately flashed in the same direction at respective intensities Ia and Ib. If the direction is the same with respect to the angle φ, then the intensity ratio ρ can be regarded as constant no matter how far the light beams reach. In the following description, the liner light projected in the same direction is supposed to have a constant light intensity ratio to make the principle of the present invention easily understandable.

Figure 17:
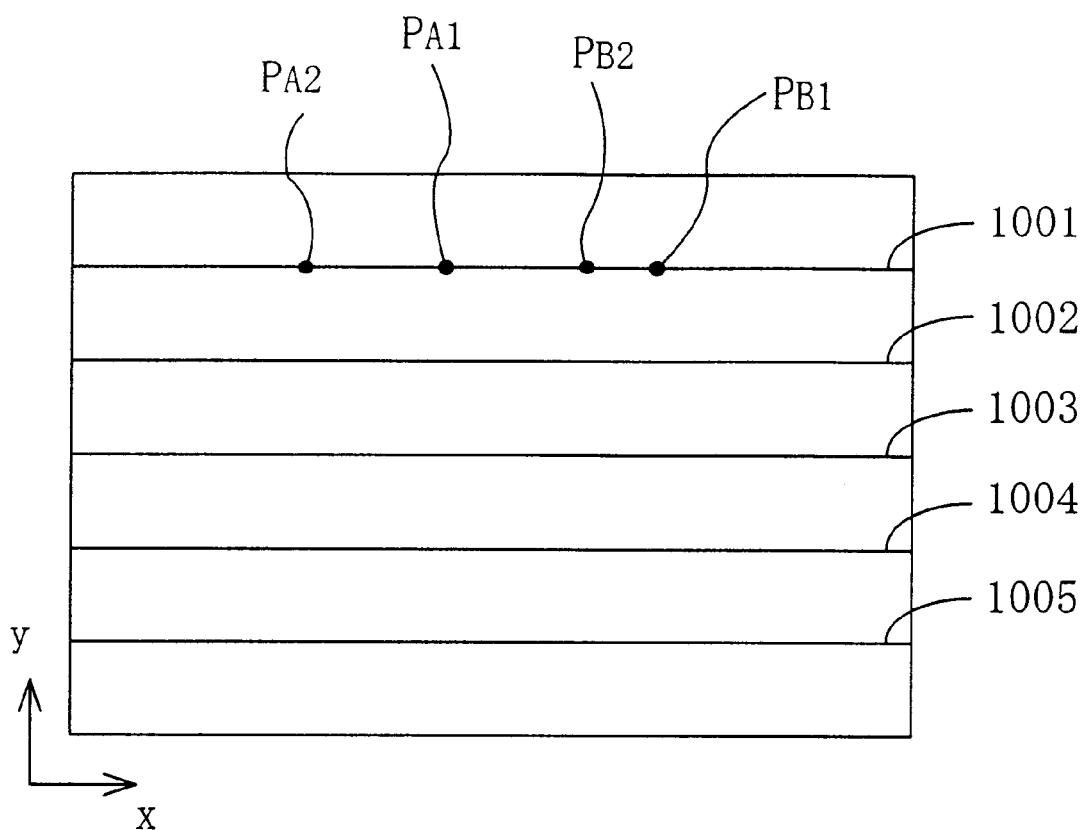
FIG. 17 schematically illustrates relationships between pixel locations on the camera image that correspond to respective points shown in FIG. 15 and a CCD line.

FIG. 17 schematically illustrates relationships between the locations of respective points PA1, PA2, PB1 and PB2 on the camera image and a CCD line. The points PA1 and PA2 are intersections of linear light LA with a constant intensity ratio ρA with the reference planes CP1 and CP2, respectively. on the other hand, the points PB1 and PB2 are intersections of linear light LB with a constant intensity ratio ρB with the reference planes CP1 and CP2, respectively.

The following points can be seen from FIGS. 15, 16 and 17.

(1) Since the linear light LA passes the point PA1 in the reference plane CP1, the light LA is contained in the plane LP1 (indicated by crossed hatching in FIG. 15) that contains the point PA1 and the center 107a of the lens and that is defined by the angle of elevation ω formed with the Z-axis.

(2) Since the linear light LA also passes the point PA2 in the reference plane CP2, the light LA is contained in the plane LP2 (indicated by non-crossed hatching in FIG. 15) that contains the point PA2 and the center 107a of the lens and that is defined by the angle of elevation ω formed with the Z-axis.

(3) The planes LP1 and LP2 form the same plane and the points PA1 and PA2 are imaged as two discrete points on the same CCD line (i.e., CCD line 1001 in FIG. 17) in the x-y plane of the camera coordinate system. That is to say, if two points with different Z coordinates are formed in two different reference planes by the linear light LA with a constant intensity ratio, then the pixels corresponding to the reflected parts of the light are always located at two different points on the same CCD line in the camera coordinate system.

(4) The same statements (1) to (3) are also true of the linear light LB, which is associated with the same angle of elevation ω but a different rotation angle φB. Specifically, the linear light LB is contained in the plane that contains the point PB1 in the reference plane CP1 and the center 107a of the lens and that is defined by the angle of elevation ω formed with the Z-axis. The linear light LB is also contained in the plane that contains the point PB2 in the reference plane CP2 and the center 107a of the lens and that is defined by the angle of elevation ω formed with the Z-axis. Accordingly, the line LZ1 connecting the points PA1 and PB1 in the reference plane CP1 and the line LZ2 connecting the points PA2 and PB2 in the reference plane CP2 always exist on the CCD line 1001 in the camera coordinate system shown in FIG. 17.

Thus, the following conclusions can be drawn.

Firstly, all the points contained in the planes LP1 and LP2 defined by the predetermined angle of elevation ω are captured in the camera image on a single CCD line 1001 associated with the same y coordinate irrespective of the Z coordinates thereof.

Secondly, as for the single linear light LA with a constant light intensity ratio ρ, the respective parts of the light LA that have been reflected from various points with mutually different Z coordinates are located on the single CCD line 1001 associated with the same y coordinate in the camera image. However, the x coordinates thereof are always different from each other. Thus, these points can be identified from each other based on the x coordinates.

Thirdly, even if various reflected light beams are incident on the same pixel location in the camera image from multiple different spatial points, these points can also be identified from each other. This is because the light intensity ratios of the reflected light beams are always different from each other.

Thus, as is done in this embodiment, (a) if an appropriate LUT is prepared for every CCD line associated with a constant y coordinate, (b) a pixel location (x, y) on the camera image and an intensity ratio ρ observed at the location are both obtained and (c) one of the LUT's that is associated with a CCD line corresponding to the pixel location is selected, then the Z coordinate of any point P on the object, which corresponds to the pixel location, is identifiable by using the LUT selected.

The LUT may be prepared in the following manner, for example. A reference plane (vertical plane) is disposed at a known Z coordinate and is irradiated with the light from the light sources 210A and 210B. Then, LUT's are made for respective y coordinates such that the measured distance of the reference plane matches the known Z coordinate. In this case, only a single reference plane may be prepared as a matter of principle. However, if an LUT is made using a plurality of reference planes, then the accuracy of measurement can be improved to a practical level.

The LUT's may be prepared for all the CCD lines. Alternatively, as is done in the foregoing embodiment, the LUT's may be prepared selectively for some of the CCD lines at regular intervals. In that case, a substitute LUT may be formed for pixels on a CCD line associated with no LUT by performing linear interpolation on the LUT's provided for the closest, or vertically adjacent, CCD lines, for example.

Also, instead of making the LUT's, approximation of function may be carried out over the entire camera image using intensity ratios ρ and pixel locations (x, y) as parameters.

EMBODIMENT 3

In the second embodiment, the camera should be disposed to meet the conditions that the epipolar lines are parallel to the x-axis of the camera coordinate system and aligned with the CCD lines. Specifically, the camera needs to be positioned such that the line connecting the center 107a of the camera lens to the center 104a of the rotating mirror is aligned with the X-axis of the world coordinate system and is parallel to the x-axis of the camera coordinate system. Thus, the camera and the light sources cannot be disposed so freely.

A rangefinder according to the third embodiment of the present invention is adapted to make the camera and light sources placeable more freely compared to the second embodiment. The basic arrangement and operation of the rangefinder of the third embodiment are the same as those described in the second embodiment. However, the third embodiment is different from the second embodiment in respects of how to dispose the camera, how to define the epipolar lines, how to make the LUT's and how the distance calculator works.

Figure 18:
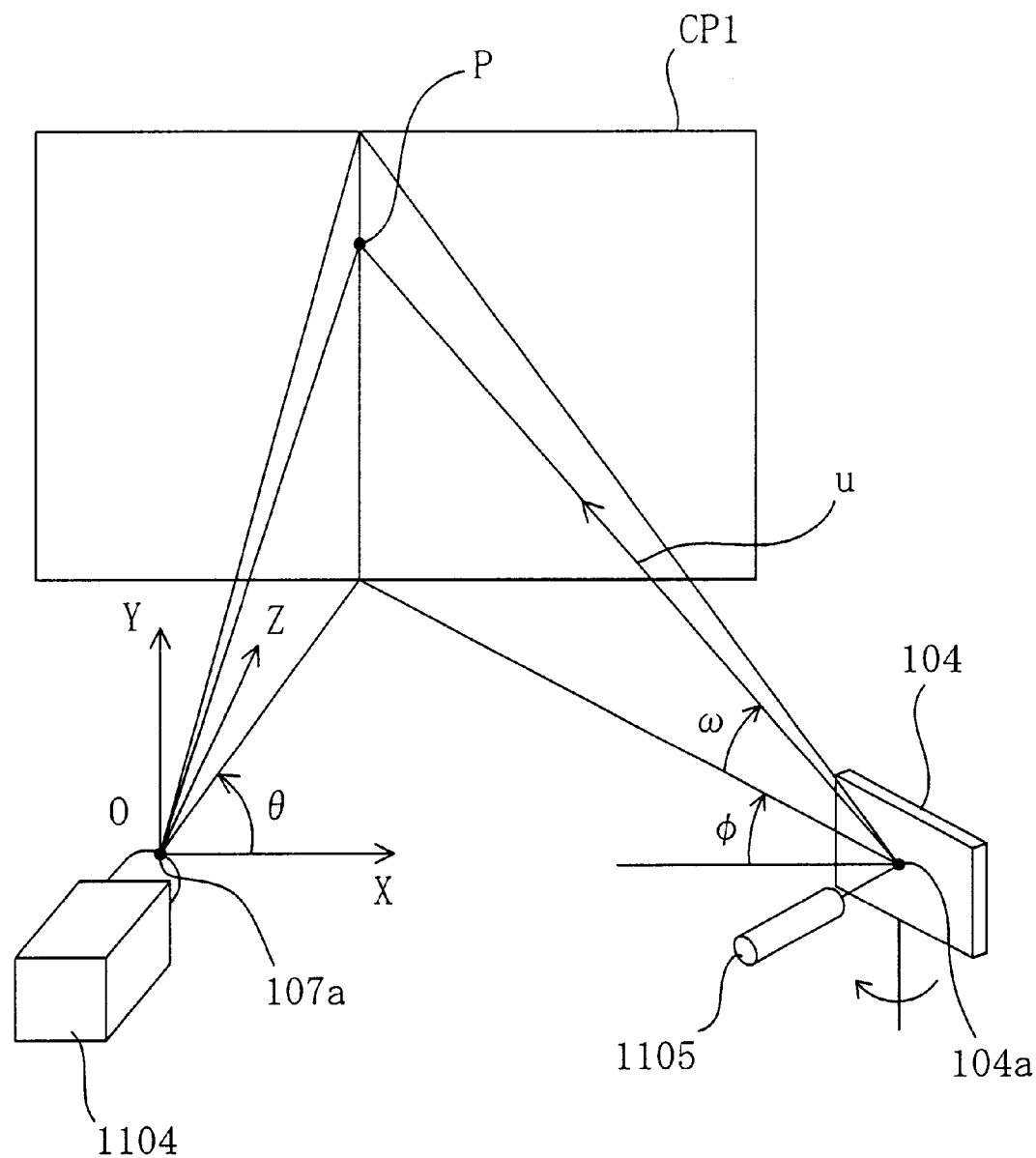
FIG. 18 is a schematic perspective view illustrating the operating principle of a rangefinder according to a third embodiment of the present invention based on the world coordinate system.

FIG. 18 is a schematic perspective view illustrating the operating principle of the rangefinder according to the third embodiment based on the world coordinate system.

According to this embodiment, the camera is disposed to meet the following conditions.

The center 107a of the lens of the camera 1104 is defined as the origin O of the world coordinate system. The optical axis of the camera 1104 is aligned with the Z-axis. And the direction of the x-axis of the camera coordinate system (i.e., the direction in which the CCD lines extend) is aligned with the X-axis. However, the center 104a of the rotating mirror does not have to be located on the X-axis. Thus, the camera and light sources can be disposed more freely than the second embodiment.

Under the camera disposition conditions adopted in this embodiment, the epipolar lines are not parallel to each other in the camera image as opposed to the second embodiment. Accordingly, to make an LUT, the shapes of the epipolar lines in the camera image should be identified first.

Shape Determination of Epipolar Lines

Figure 19A:
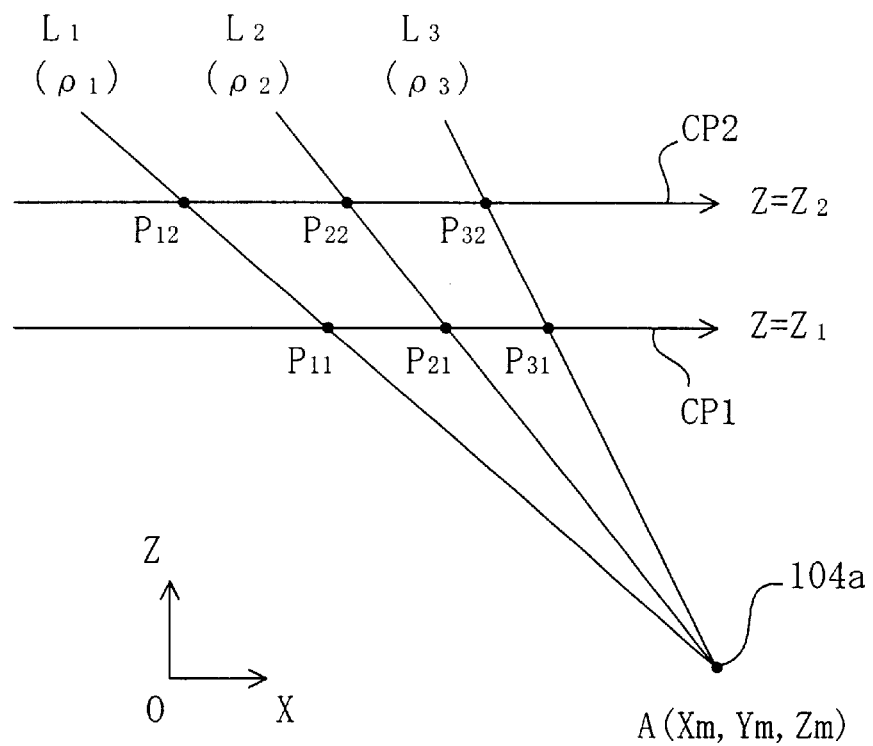
FIGS. 19(a) and 19(b) illustrate the shapes of epipolar lines according to the third embodiment.
Figure 19B:
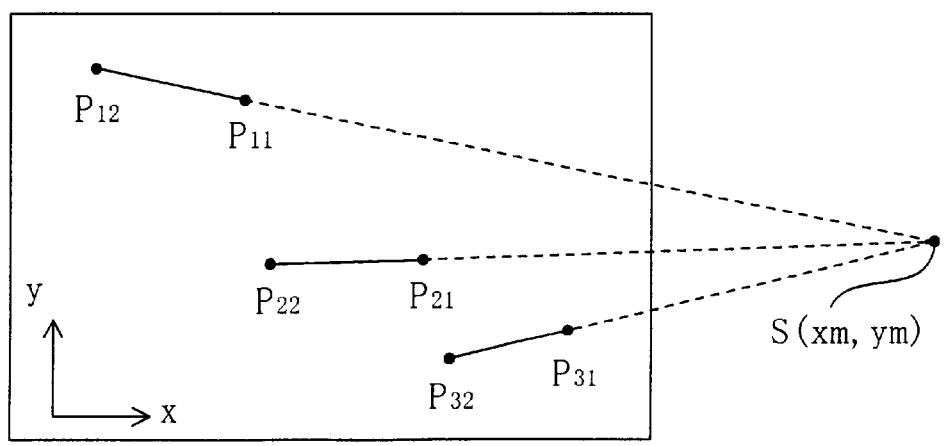

FIGS. 19(a) and 19(b) illustrate the shapes of the epipolar lines according to the third embodiment. In the illustrated embodiment, the epipolar lines radiate from a vanishing point s (xm, ym) as shown in FIG. 19(b). Thus, if the coordinates of the vanishing point S can be obtained, then the shapes of these epipolar lines can be determined.

Hereinafter, it will be described with reference to FIGS. 18, 19(a) and 19(b) how to obtain the coordinates of the vanishing point S. First, a unit direction vector u directed from the light source 1105 toward a point P is defined by the following Equation (4):

$$u = (\cos \omega \cdot \cos \phi, \sin \omega, \cos \omega \cdot \sin \phi) \quad (4)$$

Next, to separate the terms of ω and φ from each other, the respective components of Equation (4) are divided by cos ω, thereby defining a direction vector U as the following Equation (5):

$$U = (\cos \phi, \tan \omega, \sin \phi) \quad (5)$$

Computation can be simplified by using the direction vector U compared to the unit vector u given by Equation (4). This is because X and Z components are represented by using only φ and the Y component is represented by using only ω in Equation (4).

These angles φ, ω and φ are defined as shown in FIG. 18. In the illustrated embodiment, the angle ω is not the angle of elevation as defined in the second embodiment but an angle formed by the unit direction vector u with the XZ plane.

Next, as shown in FIG. 19(a), multiple (i.e., three in this example) linear light beams L1, L2 and L3, which have mutually different light intensity ratios ρ1, ρ2 and ρ3 and will result in different epipolar lines in the camera image, are projected from the center 104a of rotation onto a plurality of reference planes CP1 and CP2 with known Z coordinates Z1 and Z2. These linear light beams L1, L2 and L3 are reflected from the reference plane CP1 at points P11, P21 and P31, and from the reference plane CP2 at points P12, P22 and P32, respectively.

FIG. 19(b) illustrates where these six points P11, P12, P21, P22, P31 and P32 of reflection and the epipolar lines associated with the three linear light beams L1, L2 and L3 between the two reference planes CP1 and CP2 are located on the camera image.

Then, the locations of these reflection points P11, P12, P21, P22, P31 and P32 in the world and camera coordinate systems are identified. The coordinates A (Xm, Ym, Zm) of the center 104a of the rotating mirror can be obtained from the world coordinates of the six points P11, P12, P21, P22, P31 and P32. Also, as shown in FIG. 19(b), the coordinates (xm, ym) of the vanishing point S can be derived from the camera coordinates of the six points P11, P12, P21, P22, P31 and P32 as an intersection among the three epipolar lines.

Making LUT's

Then, epipolar lines are drawn from the vanishing point S in desired directions and LUT's corresponding to these lines are made. Hereinafter, it will be described with reference to FIGS. 20, 21(a), 21(b), 22(a) and 22(b) how to draw the epipolar lines and how to make the LUT's.

Figure 20:
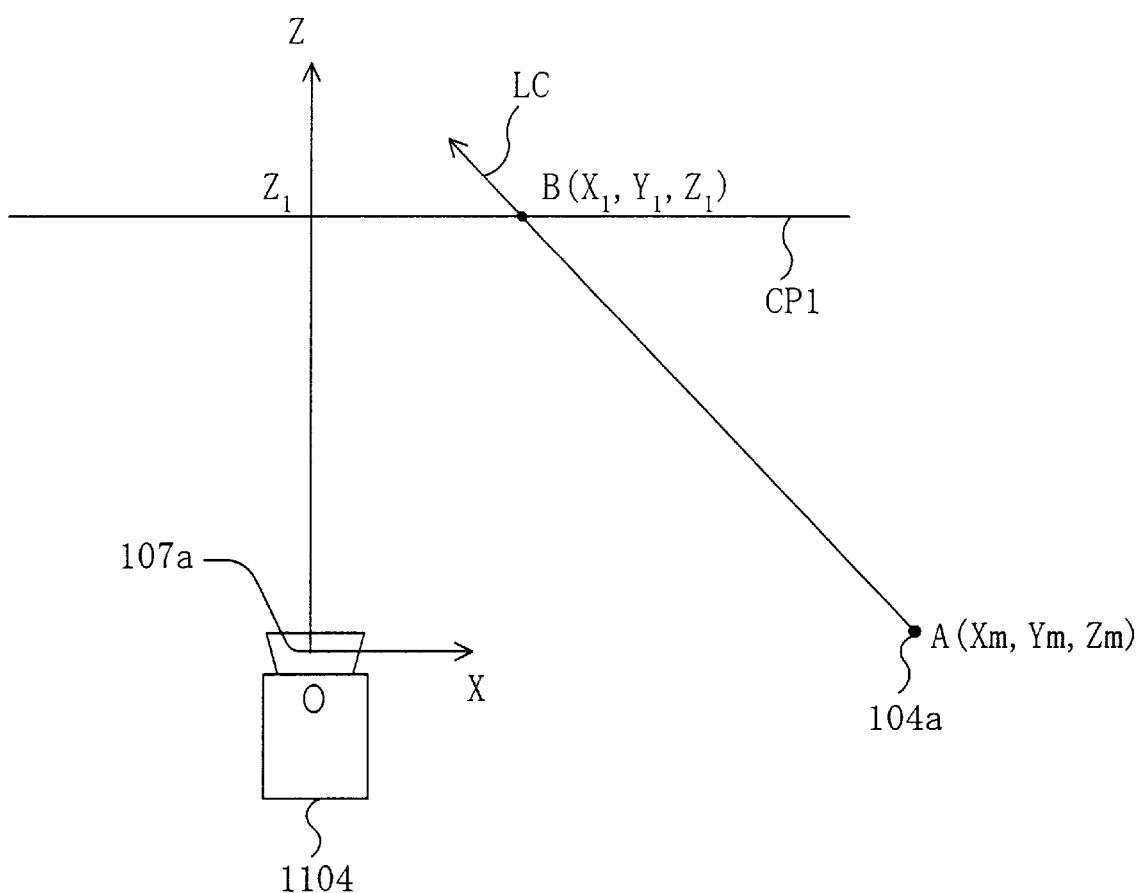
FIG. 20 is a simplified plan view illustrating a situation where a linear light beam with a constant intensity ratio has been projected.

FIG. 20 is a simplified plan view illustrating a situation where a linear light beam LC with a constant intensity ratio ρ has been projected onto a point B with known coordinates on the reference plane CP1.

First, as shown in FIG. 20, the point B with known coordinates (X1, Y1, Z1) on the reference plane CP1 is imaged. Then, the known coordinates (X1, Y1, Z1) are substituted into the following Equations (6), which represents a general relationship between coordinates (x, y) in a camera image and world coordinates (X, Y, Z):

$$x = fx \cdot X/Z$$

$$y = fy \cdot Y/Z \quad (6)$$

where fx and fy are system parameters. As a result, the following Equations (7) are obtained:

$$x=fx \cdot X1/Z1$$

$$y=fy \cdot Y1/Z1 \qquad (7)$$

Since (x, y) are coordinates in the camera image, fx and fy can be derived from Equations (7).

Figure 21A:
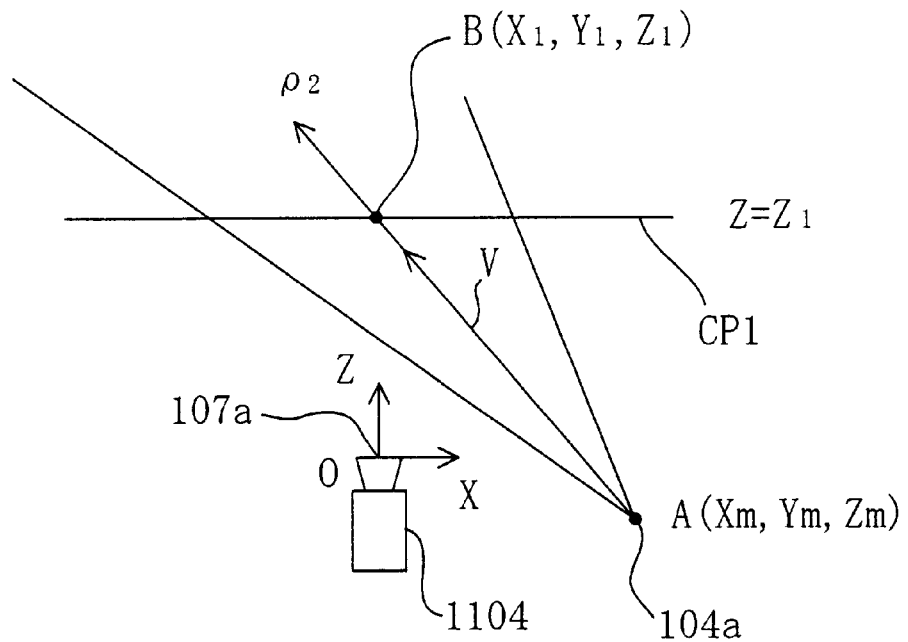
FIGS. 21(a) and 21(b) illustrate how to make an LUT in accordance with the third embodiment.
Figure 21B:
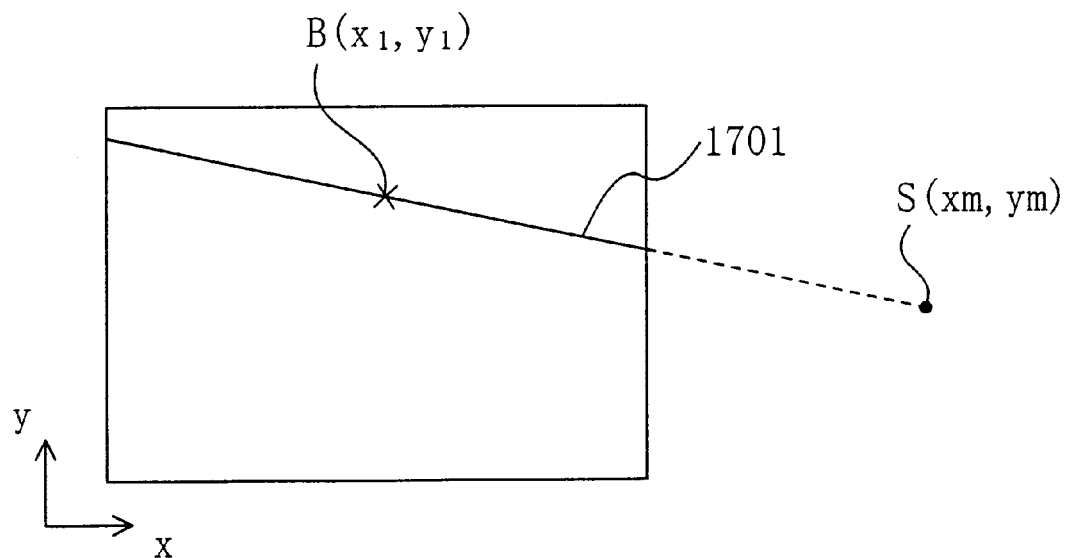

Next, as shown in FIG. 21(a), two intensity-modulated pattern light beams are projected in the direction of the vector V, and the light reflected from the reference plane CP1 with its Z coordinate=Z1 is received at the camera 1104. In this case, the intensities of these pattern light beams are represented as Ia2 and Ib2, respectively, and its intensity ratio as ρ2 (=Ia2/Ib2). As shown in FIG. 21(b), a single epipolar line 1701 is formed on the camera image by the linear light with the intensity ratio ρ2.

Once the pixel location B (x1, y1) in the camera image and the intensity ratio ρ2 have been obtained, the two unknown coordinates X1 and Y1 are given by the following Equations (8) using the known Z coordinate Z1 and the system parameters fx and fy derived by Equations (7):

$$X1=x1 \cdot Z1/fx$$

$$Y1=y1 \cdot Z1/fy \qquad (8)$$

Also, the direction vector V from the point A toward the point B is given by the following Equation (9):

$$V=(X1-Xm, Y1-Ym, Z1-Zm) \qquad (9)$$

This Equation (9) is modifiable into the following Equation (10) such that the magnitude of the vector V is equalized with that of the direction vector U given by Equation (5):

$$V=(X1-Xm/\{(X1-Xm)^2+(Z1-Zm)^2\}^{1/2},$$

$$Y1-Ym/\{(X1-Xm)^2+(Z1-Zm)^2\}^{1/2},$$

$$Z1-Zm/\{(X1-Xm)^2+(Z1-Zm)^2\}^{1/2}) \qquad (10)$$

Comparing Equation (10) to the first and third components of Equation (5), the following Equations (11) are obtained:

$$\cos \phi = X1-Xm/\{(X1-Xm)^2+(Z1-Zm)^2\}^{1/2}$$

$$\sin \phi = Z1-Zm/\{(X1-Xm)^2+(Z1-Zm)^2\}^{1/2} \qquad (11)$$

φ can be determined in accordance with these Equations (11). Also, tan ω can be determined by the second component of Equation (10).

As a result of these computations, the correspondence between the intensity ratio ρ and the rotation angle φ and the correspondence between the intensity ratio ρ and the angle of elevation ω in the vertical plane containing the line AB are defined for the point B. The correspondence between the intensity ratio ρ and the rotation angle φ and the correspondence between the intensity ratio ρ and the angle of elevation ω can also be defined in the same way for the other points on the epipolar line 1701.

Figure 22A:
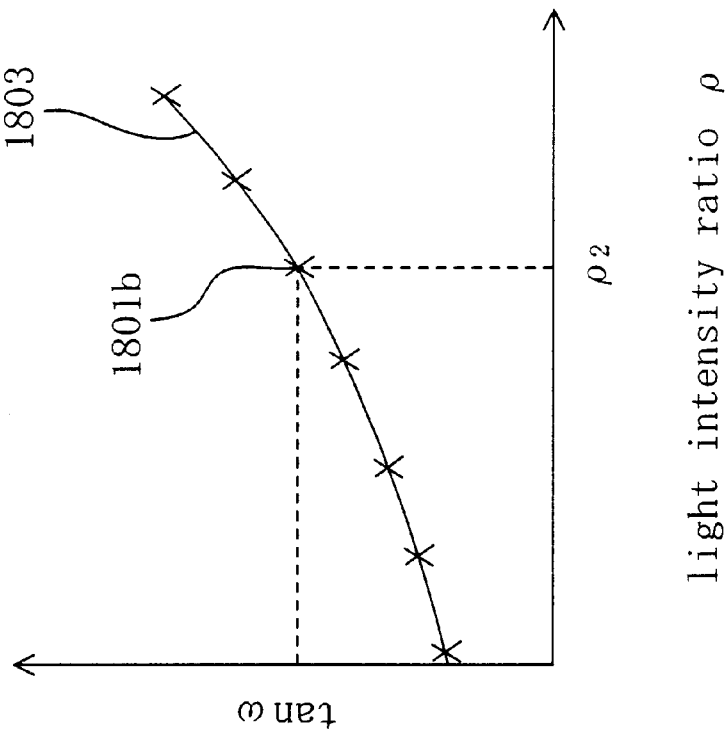
FIGS. 22(a) and 22(b) are graphs illustrating information to be stored on an LUT for a single epipolar line.
Figure 22B:
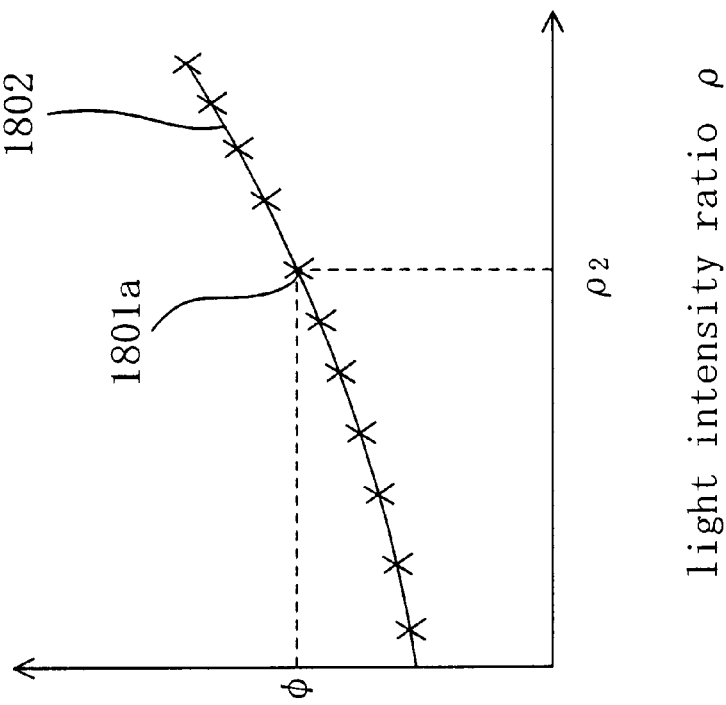

FIGS. 22(a) and 22(b) illustrate information to be stored on an LUT associated with a single epipolar line. FIG. 22(a) is a graph illustrating a relationship between the intensity ratio ρ and the angle of rotation φ, while FIG. 22(b) is a graph illustrating a relationship between the intensity ratio ρ and the angle of elevation tan ω. In FIGS. 22(a) and 22(b), the points 1801a and 1801b correspond to the point B shown in FIGS. 21(a) and 21(b). By plotting respective points of the same epipolar line on the graphs in the same way as the points 1801a and 1801b and fitting the plots in accordance with a third-order equation, an LUT corresponding to a single epipolar line can be made.

LUT's can be made in the same way for other desired epipolar lines.

How to Estimate Z Coordinate

Hereinafter, it will be described how to estimate the Z coordinate of the point P.

An LUT is selected based on the coordinates (x, y) of the point P in question in the camera coordinate system. And the vector (cos φ, tan ω, sin φ) representing the direction from the light source toward the point P is known from the light intensity ratio ρ of the pixel associated with the point P by reference to the LUT selected.

Thus, the line connecting the light source to the point P in question is given by the following Equation (12) using a parameter t:

$$\begin{bmatrix} X_m \\ Y_m \\ Z_m \end{bmatrix} + \begin{bmatrix} \cos\phi \\ \tan\omega \\ \sin\phi \end{bmatrix} t = \begin{bmatrix} X \\ Y \\ Z \end{bmatrix} \qquad (12)$$

Also, Equations (6) are modifiable into the following Equations (13):

$$fx \cdot X - x \cdot z = 0$$

$$fy \cdot Y - y \cdot z = 0 \qquad (13)$$

which are further modifiable into the following Equations (14):

$$fx \cdot X + fy \cdot Y - (x+y)Z = 0 \qquad (14)$$

Since the intersection of the line represented by Equation (12) with the plane represented by Equation (14) is the point P, the coordinates (X, Y, Z) of the point P in the world coordinate system are given by solving the following Equation (15):

$$\begin{bmatrix} 1 & 0 & 0 & -\cos\phi \\ 0 & 1 & 0 & -\tan\omega \\ 0 & 0 & 1 & -\sin\phi \\ f_x & f_y & -x-y & 0 \end{bmatrix} \begin{bmatrix} X \\ Y \\ Z \\ t \end{bmatrix} = \begin{bmatrix} X_m \\ Y_m \\ Z_m \\ 0 \end{bmatrix} \qquad (15)$$

If not all of the X, Y and Z coordinates have to be estimated but only the Z coordinate should be obtained, then the Z coordinate is obtained by solving the following Equation (17) using Equations (16), which are parts of Equation (12), and Equation (13):

$$Xm + \cos \phi \cdot t = X$$

$$Zm + \sin \phi \cdot t = Z \qquad (16)$$

$$\begin{bmatrix} 1 & 0 & -\cos\phi \\ 0 & 1 & -\sin\phi \\ f_x & -x & 0 \end{bmatrix} \begin{bmatrix} X \\ Z \\ t \end{bmatrix} = \begin{bmatrix} X_m \\ Z_m \\ 0 \end{bmatrix} \qquad (17)$$

In this case, only the LUT's concerning the correspondence between the light intensity ratio ρ and the rotation angle φ should be used.

As can be seen, the camera and the light source can be disposed more freely according to the third embodiment than the second embodiment.

Modified Example of Embodiment 3

In the foregoing third embodiment, the center 107a of the lens is supposed to be located at the origin O of the world coordinate system. However, the center 107a of the lens does not have to be defined as the origin O. Nevertheless, if the center 107a and the origin O are located at different positions, then corrections should be made on the coordinate system.

Figure 23:
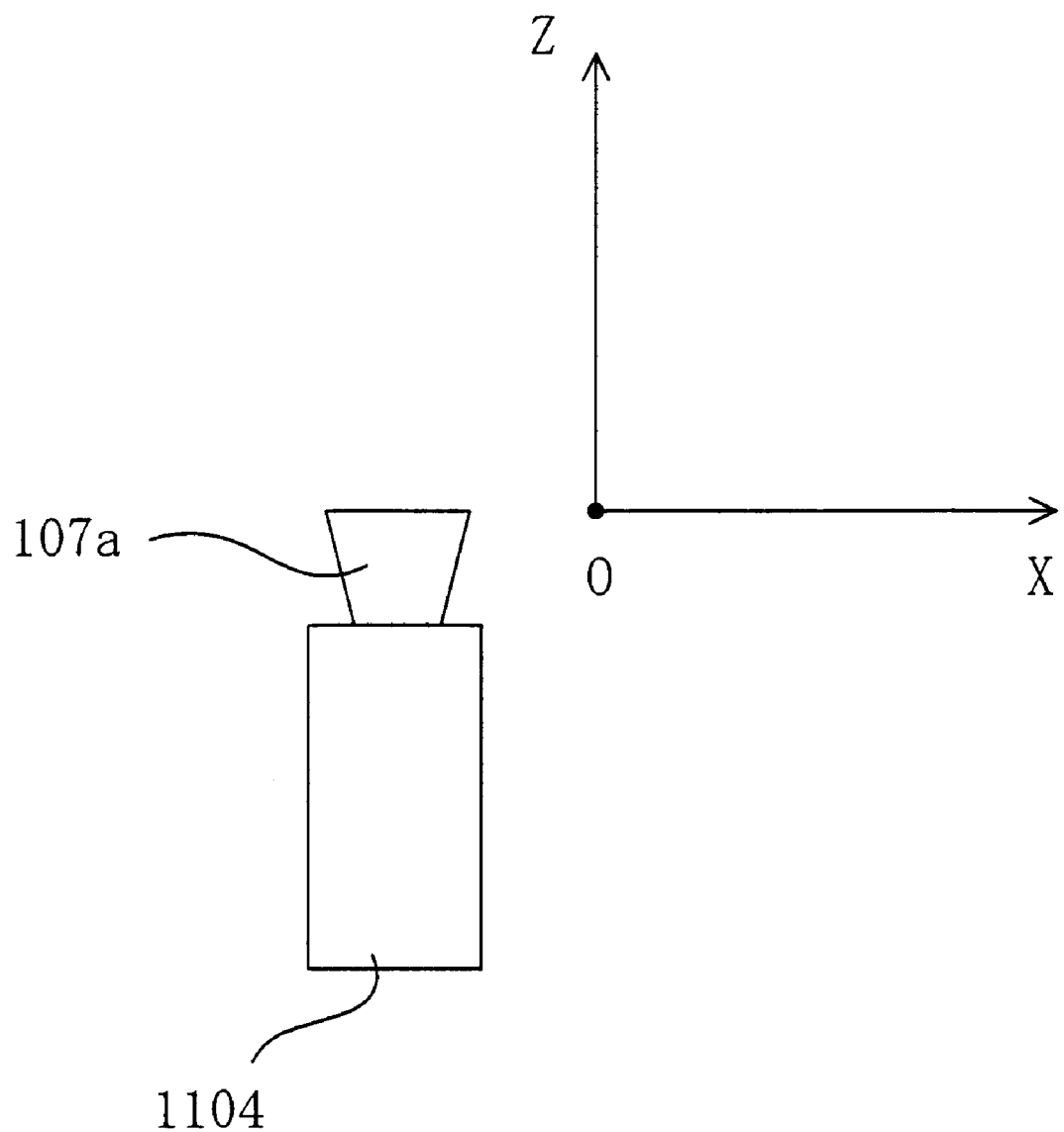
FIG. 23 illustrates a positional relationship between the origin O of the world coordinate system and the center of the lens in a modified example of the third embodiment.

FIG. 23 illustrates a positional relationship between the origin O of the world coordinate system and the center 107a of the lens in this modified example. In the situation illustrated in FIG. 23, corrections may be made on the coordinate system by determining the positional relationship between the center 107a of the lens and the origin O according to a known camera calibration method (see Seiji Inoguchi and Kosuke Sato, "3D Imaging Techniques for Measurement", Shokodo, pp. 92–95).

First, the following camera parameter matrix (18) is obtained by the known camera calibration method:

$$C = \begin{bmatrix} c_{11} & c_{12} & c_{13} & c_{14} \\ c_{21} & c_{22} & c_{23} & c_{24} \\ c_{31} & c_{32} & c_{33} & c_{34} \end{bmatrix} \quad (18)$$

In accordance with the camera parameter matrix (18), a relationship as represented by the following Equation (19) is met between the camera coordinates (x, y) and the world coordinates (X, Y, Z):

$$\begin{bmatrix} x \cdot h \\ y \cdot h \\ h \end{bmatrix} = C \begin{bmatrix} X \\ Y \\ Z \\ 1 \end{bmatrix} \quad (19)$$

The position A (Xm, Ym, Zm) of the center 104a of the rotating mirror, the coordinates S (xm, ym) of the vanishing point and the LUT's are obtained as in the third embodiment.

The Z coordinate of the point P in question can also be estimated basically in the same way as the third embodiment. However, instead of obtaining the intersection between the line represented by Equation (12) and the plane represented by Equation (14), the coordinates (X, Y, Z) are derived by solving the following Equation (20) using Equations (12) and (19):

$$\begin{bmatrix} 1 & 0 & 0 & -\cos\phi \\ 0 & 1 & 0 & -\tan\omega \\ 0 & 0 & 1 & -\sin\phi \\ C_{11}+C_{21}-C_{31}(x+y) & C_{12}+C_{22}-C_{32}(x+y) & C_{13}+C_{23}-C_{33}(x+y) & 0 \end{bmatrix} \begin{bmatrix} X \\ Y \\ Z \\ t \end{bmatrix} = \begin{bmatrix} X_m \\ Y_m \\ Z_m \\ C_{14}+C_{24}-C_{34}(x+y) \end{bmatrix} \quad (20)$$

In estimating the angles $\phi$ and $\omega$ based on the light intensity ratio $\rho$, both x and y coordinates on the camera image are required.

According to this modified example, the camera and light source can be disposed even more freely.

In the foregoing second and third embodiments, an LUT is provided for each predetermined epipolar line. Alternatively, an LUT may be provided for each and every pixel based on the same principle. However, some redundancy is unavoidable in such a case because the same information is contained in several LUT's.

Also, even if an epipolar line is not parallel to the x-axis as in the third embodiment, the accuracy of 3D information can be improved compared to the prior art by providing LUT's for respective y coordinates. Optionally, LUT's may also be provided for respective x coordinates. Even so, the accuracy of 3D information obtained is still higher compared to providing just one LUT for the entire camera image.

Moreover, in the second and third embodiments, two light sources are provided. Optionally, a single light source may be provided and two types of modulated light beams may be alternately projected at regular intervals, for example. The rangefinder according to the second or third embodiment uses the laser light sources and rotating mirror. However, the same effects are attainable according to the second and third embodiments even by using a pair of flash lamps as substitute light sources as in the first embodiment. In such a case, the vertical gap between these two flash lamps should be as small as possible such that the epipolar lines resulting from the two flash lamps can be regarded as being substantially aligned with each other within the measurement range.

As is apparent from the foregoing description, according to the present invention, even if the intensity of projected light has changed, the corresponding variation in intensity of the reflected light image can be corrected, thus generating highly accurate 3D information.

In addition, according to the present invention, even though one-to-one relationship between the optical characteristic of the reflected light and the direction in which the light was projected is not met in the camera image, a best LUT is selected depending on the pixel location in question. As a result, very accurate 3D information can be obtained.

What is claimed is:

1. A rangefinder comprising:

a light source for projecting a set of light patterns onto an object, an intensity ratio of the projected light patterns being monotonously increasing or decreasing on the object at least from place to place;

a camera for capturing a pair of images of the object by using parts of the projected light patterns, the parts having been reflected from the object; and a three-dimensional information generator for generating three-dimensional information of the object from the reflected light images captured by the camera, wherein the three-dimensional information generator includes a light intensity corrector, which corrects intensities of the reflected light images according to correction information representing intensities of the projected light patterns, and generates the three-dimensional using a pair of images that have been by the light intensity corrector.

2. The rangefinder of claim 1, wherein the light source projects multiple light beams with mutually different projection patterns, and wherein the light intensity corrector corrects respective intensities of reflected light images corresponding to the projected beams, and wherein the three-dimensional information generator generates the three-dimensional information based on a ratio of intensities of the reflected light images that have been corrected by the light intensity corrector.

3. The rangefinder of claim 1, further comprising a light receiver for detecting an intensity of the light that has been projected from the light source and outputting the intensity as the correction information.

4. The rangefinder of claim 1, wherein the light intensity corrector uses, as the correction information, brightness in a predetermined part of the image captured by the camera.

5. The rangefinder of claim 1, wherein the light intensity corrector performs offset processing on the reflected light image by subtracting black level components from image data and then makes the correction.

6. A rangefinder comprising:

a light source for projecting a set of light patterns onto an object, an intensity ratio of the projected light patterns being monotonously increasing or decreasing depending on a direction in which the light has been projected;

a camera for capturing a pair of images of the object by using parts of the projected light patterns, the parts having been reflected from the object; and a three-dimensional information generator for generating three-dimensional information of the object from the reflected light images captured by the camera, wherein the three-dimensional information generator includes multiple lookup tables, each describing a correspondence between the intensity ratio and the direction in which the light has been projected, selects at least one of the lookup tables for each pixel location in the images captured by the camera and generates the three-dimensional information by reference to the lookup table(s) selected.

7. A rangefinder comprising:

a light source for projecting light onto an object such that a characteristic of the projected light monotonously varies depending on a direction in which the light has been projected;

a camera for capturing an image of the object by using part of the projected light, the part having been reflected from the object; and a three-dimensional information generator for generating three-dimensional information of the object from the reflected light image captured by the camera, wherein the three-dimensional information generator includes multiple lookup tables, each describing a correspondence between the characteristic of the reflected light and the direction in which the light has been projected, selects at least one of the lookup tables for each pixel location in the image captured by the camera and generates the three-dimensional information by reference to the lookup table(s) selected, wherein the lookup tables are provided for at least some epipolar lines in the image captured by the camera.

8. The rangefinder of claim 7, wherein the three-dimensional information generator newly makes a lookup table for pixels on one of the epipolar lines that is associated with none of the lookup tables by performing interpolation on at least two of the existent lookup tables associated with corresponding ones of the epipolar lines near the epipolar line on target.

9. The rangefinder of claim 7, wherein the light source and the camera are placed such that a line connecting the light source and the camera together matches an X-axis of a world coordinate system and is parallel to an x-axis of a camera coordinate system.

* * * * *